(12) United States Patent
Greenbaum et al.

(10) Patent No.: US 9,947,007 B2
(45) Date of Patent: Apr. 17, 2018

(54) PAYMENT INFORMATION TECHNOLOGIES

(71) Applicants: Barry Greenbaum, Teaneck, NJ (US); Roman Tsibulevskiy, Teaneck, NJ (US)

(72) Inventors: Barry Greenbaum, Teaneck, NJ (US); Roman Tsibulevskiy, Teaneck, NJ (US)

( * ) Notice: Subject to any disclaimer, the term of this patent is extended or adjusted under 35 U.S.C. 154(b) by 184 days.

(21) Appl. No.: 14/165,240

(22) Filed: Jan. 27, 2014

(65) Prior Publication Data

US 2014/0214654 A1 Jul. 31, 2014

Related U.S. Application Data

(60) Provisional application No. 61/757,224, filed on Jan. 27, 2013.

(51) Int. Cl.
*G06Q 20/00* (2012.01)
*G06Q 20/34* (2012.01)

(52) U.S. Cl.
CPC ............. *G06Q 20/34* (2013.01); *G06Q 20/00* (2013.01)

(58) Field of Classification Search
CPC ...................................................... G06Q 20/00
See application file for complete search history.

(56) References Cited

U.S. PATENT DOCUMENTS

| | | | |
|---|---|---|---|
| 3,727,186 A | 4/1973 | Stephenson, Jr. et al. |
| 4,485,300 A | 11/1984 | Peirce |
| 5,231,569 A | 7/1993 | Myatt et al. |
| 5,233,655 A | 8/1993 | Shapiro |
| 5,483,445 A | 1/1996 | Pickering |
| 5,615,408 A | 3/1997 | Johnson et al. |
| 5,649,118 A | 7/1997 | Carlisle et al. |
| 5,679,938 A | 10/1997 | Templeton et al. |
| 5,679,940 A | 10/1997 | Templeton et al. |

(Continued)

OTHER PUBLICATIONS

"Credit Cards & Credit Card Applications from Bank of America", www.bankofamerica.com, https://www.bankofamerica.com/credit-cards/overview.go, (Accessed Jun. 12, 2014), 1 page.

(Continued)

*Primary Examiner* — Robert R Niquette
*Assistant Examiner* — William J Jacob

(57) ABSTRACT

A method includes maintaining first payment card information for a cardholder. The method includes processing a first card not present transaction between the cardholder and a merchant. The first transaction based at least in part on the first information. The method includes generating second payment card information for the cardholder. The second information replacing the first information for subsequent use via the cardholder. The method includes receiving an input from the cardholder. The input indicating the merchant. The input based at least in part on the second information replacing the first information. The method includes sending the second information to the merchant based at least in part on the input. The method includes processing a second card not present transaction between the cardholder and the merchant. The second transaction based at least in part on the second information after the sending.

20 Claims, 10 Drawing Sheets

(56) References Cited

U.S. PATENT DOCUMENTS

| | | | |
|---|---|---|---|
| 5,832,068 A | 11/1998 | Smith | |
| 5,878,215 A * | 3/1999 | Kling | G06Q 20/00 370/282 |
| 6,029,175 A * | 2/2000 | Chow | G06F 17/30899 |
| 6,427,140 B1 | 7/2002 | Ginter et al. | |
| 6,820,204 B1 * | 11/2004 | Desai | G06F 21/6245 705/51 |
| 7,080,035 B1 | 7/2006 | Williams et al. | |
| 7,415,450 B2 * | 8/2008 | Gopalan | G06F 21/6245 |
| 7,600,676 B1 | 10/2009 | Rados et al. | |
| 7,620,592 B2 | 11/2009 | O'Mara et al. | |
| 7,809,650 B2 | 10/2010 | Bruesewitz et al. | |
| 7,844,519 B2 | 11/2010 | Wehunt et al. | |
| 7,970,705 B2 | 6/2011 | Patterson | |
| 7,987,138 B2 | 7/2011 | Patterson | |
| 8,095,464 B2 | 1/2012 | Patterson et al. | |
| 8,311,943 B2 | 11/2012 | Patterson | |
| 8,706,622 B2 | 4/2014 | Winters et al. | |
| 2001/0034720 A1 | 10/2001 | Armes | |
| 2001/0037299 A1 | 11/2001 | Nichols et al. | |
| 2002/0004770 A1 * | 1/2002 | Phillips | G06Q 20/102 705/34 |
| 2002/0022966 A1 | 2/2002 | Horgan | |
| 2002/0043566 A1 | 4/2002 | Goodman et al. | |
| 2002/0088849 A1 | 7/2002 | Nichols et al. | |
| 2002/0111919 A1 | 8/2002 | Weller et al. | |
| 2002/0194138 A1 | 12/2002 | Dominguez et al. | |
| 2003/0046235 A1 | 3/2003 | Lacivita et al. | |
| 2003/0078884 A1 | 4/2003 | Bauman | |
| 2003/0105723 A1 * | 6/2003 | Skea | G06Q 20/04 705/64 |
| 2003/0130919 A1 | 7/2003 | Templeton et al. | |
| 2003/0138084 A1 | 7/2003 | Lynam et al. | |
| 2003/0167226 A1 | 9/2003 | Britton et al. | |
| 2003/0167231 A1 | 9/2003 | Winking et al. | |
| 2003/0195858 A1 | 10/2003 | Watanabe et al. | |
| 2003/0200184 A1 | 10/2003 | Dominguez et al. | |
| 2003/0212642 A1 | 11/2003 | Weller et al. | |
| 2003/0225688 A1 | 12/2003 | Dobbins | |
| 2003/0225742 A1 * | 12/2003 | Tenner | G06F 17/30557 |
| 2004/0006537 A1 | 1/2004 | Zelechoski et al. | |
| 2004/0024731 A1 * | 2/2004 | Cabrera | G06F 17/3089 |
| 2004/0054587 A1 | 3/2004 | Dev et al. | |
| 2004/0083184 A1 | 4/2004 | Tsuei et al. | |
| 2004/0098351 A1 | 5/2004 | Duke | |
| 2004/0117300 A1 | 6/2004 | Jones et al. | |
| 2004/0117302 A1 | 6/2004 | Weichert et al. | |
| 2004/0124246 A1 | 7/2004 | Allen et al. | |
| 2004/0128256 A1 | 7/2004 | Krouse et al. | |
| 2004/0133516 A1 | 7/2004 | Buchanan et al. | |
| 2004/0148255 A1 | 7/2004 | Beck et al. | |
| 2004/0155101 A1 | 8/2004 | Royer et al. | |
| 2004/0158532 A1 | 8/2004 | Breck et al. | |
| 2004/0181453 A1 | 9/2004 | Ray et al. | |
| 2004/0182922 A1 | 9/2004 | Talarico, Jr. | |
| 2004/0185830 A1 | 9/2004 | Joao et al. | |
| 2004/0210448 A1 | 10/2004 | Breck et al. | |
| 2004/0210449 A1 | 10/2004 | Breck et al. | |
| 2004/0243498 A1 | 12/2004 | Duke | |
| 2004/0254848 A1 | 12/2004 | Golan et al. | |
| 2004/0254893 A1 | 12/2004 | Tsuei et al. | |
| 2004/0254894 A1 | 12/2004 | Tsuei et al. | |
| 2004/0260646 A1 | 12/2004 | Berardi et al. | |
| 2004/0260653 A1 | 12/2004 | Tsuei et al. | |
| 2005/0010524 A1 | 1/2005 | Gutbrod et al. | |
| 2005/0021456 A1 | 1/2005 | Steele et al. | |
| 2005/0021457 A1 | 1/2005 | Johnson et al. | |
| 2005/0038718 A1 | 2/2005 | Barnes et al. | |
| 2005/0038741 A1 | 2/2005 | Bonalle et al. | |
| 2005/0049950 A1 | 3/2005 | Johnson | |
| 2005/0049964 A1 | 3/2005 | Winterer et al. | |
| 2005/0075977 A1 | 4/2005 | Carroll et al. | |
| 2005/0080717 A1 | 4/2005 | Belyi et al. | |
| 2005/0080724 A1 | 4/2005 | Foss, Jr. | |
| 2005/0080726 A1 | 4/2005 | Krajewski et al. | |
| 2005/0080728 A1 | 4/2005 | Sobek | |
| 2005/0087594 A1 | 4/2005 | Phillips et al. | |
| 2005/0149455 A1 | 7/2005 | Bruesewitz et al. | |
| 2005/0149544 A1 * | 7/2005 | Bishop | G06Q 20/00 |
| 2005/0165682 A1 | 7/2005 | Duke | |
| 2005/0197954 A1 | 9/2005 | Maitland et al. | |
| 2005/0203842 A1 | 9/2005 | Sanchez et al. | |
| 2005/0246181 A1 | 11/2005 | Kawahara | |
| 2005/0269396 A1 | 12/2005 | Schofield | |
| 2005/0283436 A1 | 12/2005 | Greer et al. | |
| 2006/0000891 A1 | 1/2006 | Bonalle et al. | |
| 2006/0000892 A1 | 1/2006 | Bonalle et al. | |
| 2006/0000893 A1 | 1/2006 | Bonalle et al. | |
| 2006/0000894 A1 | 1/2006 | Bonalle et al. | |
| 2006/0000895 A1 | 1/2006 | Bonalle et al. | |
| 2006/0000896 A1 | 1/2006 | Bonalle et al. | |
| 2006/0000897 A1 | 1/2006 | Bonalle et al. | |
| 2006/0000898 A1 | 1/2006 | Bonalle et al. | |
| 2006/0000899 A1 | 1/2006 | Bonalle et al. | |
| 2006/0016868 A1 | 1/2006 | Bonalle et al. | |
| 2006/0016869 A1 | 1/2006 | Bonalle et al. | |
| 2006/0016870 A1 | 1/2006 | Bonalle et al. | |
| 2006/0016871 A1 | 1/2006 | Bonalle et al. | |
| 2006/0016872 A1 | 1/2006 | Bonalle et al. | |
| 2006/0016873 A1 | 1/2006 | Bonalle et al. | |
| 2006/0016874 A1 | 1/2006 | Bonalle et al. | |
| 2006/0016875 A1 | 1/2006 | Bonalle et al. | |
| 2006/0016876 A1 | 1/2006 | Bonalle et al. | |
| 2006/0016877 A1 | 1/2006 | Bonalle et al. | |
| 2006/0020558 A1 | 1/2006 | Bonalle et al. | |
| 2006/0076400 A1 | 4/2006 | Fletcher | |
| 2006/0100927 A1 | 5/2006 | Zormati | |
| 2006/0116949 A1 | 6/2006 | Wehunt et al. | |
| 2006/0116954 A1 | 6/2006 | Strayer et al. | |
| 2006/0249571 A1 | 11/2006 | Duke | |
| 2006/0265602 A1 | 11/2006 | Robinson | |
| 2006/0278698 A1 | 12/2006 | Lovett | |
| 2006/0282381 A1 | 12/2006 | Ritchie | |
| 2007/0005509 A1 | 1/2007 | Spiller et al. | |
| 2007/0038560 A1 | 2/2007 | Ansley | |
| 2007/0038579 A1 | 2/2007 | Ansley | |
| 2007/0067239 A1 | 3/2007 | Dheer et al. | |
| 2007/0083444 A1 | 4/2007 | Matthews et al. | |
| 2007/0119918 A1 | 5/2007 | Hogg et al. | |
| 2007/0119919 A1 | 5/2007 | Hogg et al. | |
| 2007/0119920 A1 | 5/2007 | Hogg et al. | |
| 2007/0119921 A1 | 5/2007 | Hogg et al. | |
| 2007/0124238 A1 | 5/2007 | Hogg et al. | |
| 2007/0156553 A1 | 7/2007 | Zimmerman | |
| 2007/0156557 A1 | 7/2007 | Shao et al. | |
| 2007/0165803 A1 | 7/2007 | Duan | |
| 2007/0185810 A1 | 8/2007 | Kalra et al. | |
| 2007/0198437 A1 | 8/2007 | Eisner et al. | |
| 2007/0210150 A1 | 9/2007 | Winking et al. | |
| 2007/0228161 A1 | 10/2007 | Fletcher | |
| 2007/0239604 A1 | 10/2007 | O'Connell et al. | |
| 2007/0284434 A1 | 12/2007 | Fletcher | |
| 2008/0006691 A1 | 1/2008 | Bonalle et al. | |
| 2008/0008363 A1 | 1/2008 | Bonalle et al. | |
| 2008/0010214 A1 | 1/2008 | Bonalle et al. | |
| 2008/0011830 A1 | 1/2008 | Bonalle et al. | |
| 2008/0011831 A1 | 1/2008 | Bonalle et al. | |
| 2008/0013796 A1 | 1/2008 | Bonalle et al. | |
| 2008/0013807 A1 | 1/2008 | Bonalle et al. | |
| 2008/0015992 A1 | 1/2008 | Bonalle et al. | |
| 2008/0015993 A1 | 1/2008 | Bonalle et al. | |
| 2008/0015994 A1 | 1/2008 | Bonalle et al. | |
| 2008/0033880 A1 | 2/2008 | Fiebiger et al. | |
| 2008/0052230 A1 | 2/2008 | Crane et al. | |
| 2008/0052244 A1 | 2/2008 | Tsuei et al. | |
| 2008/0059373 A1 | 3/2008 | Phillips et al. | |
| 2008/0067242 A1 | 3/2008 | Bonalle et al. | |
| 2008/0072065 A1 | 3/2008 | Bonalle et al. | |
| 2008/0109358 A1 | 5/2008 | Kottmeier, Jr. | |
| 2008/0110980 A1 | 5/2008 | Hogg et al. | |
| 2008/0133350 A1 | 6/2008 | White et al. | |
| 2008/0133351 A1 | 6/2008 | White et al. | |
| 2008/0156873 A1 | 7/2008 | Wilhelm et al. | |
| 2008/0162338 A1 | 7/2008 | Samuels et al. | |

(56) References Cited

U.S. PATENT DOCUMENTS

| | | |
|---|---|---|
| 2008/0173708 A1 | 7/2008 | Bonalle et al. |
| 2008/0201224 A1 | 8/2008 | Owens et al. |
| 2008/0208689 A1 | 8/2008 | Johnson et al. |
| 2008/0210754 A1 | 9/2008 | Lovett |
| 2008/0223920 A9 | 9/2008 | Duke |
| 2008/0275820 A1 | 11/2008 | Joao et al. |
| 2008/0298573 A1 | 12/2008 | Monk |
| 2008/0300895 A1 | 12/2008 | Monk |
| 2008/0301011 A1 | 12/2008 | Monk |
| 2008/0301037 A1 | 12/2008 | Monk |
| 2008/0301050 A1 | 12/2008 | DiGioacchino |
| 2008/0301056 A1 | 12/2008 | Weller et al. |
| 2009/0063346 A1 | 3/2009 | DiGioacchino |
| 2009/0063347 A1 | 3/2009 | DiGioacchino |
| 2009/0171839 A1* | 7/2009 | Rosano ............... G06Q 20/102 705/40 |
| 2009/0173783 A1 | 7/2009 | Fomitchev |
| 2009/0240597 A1* | 9/2009 | Oswald ............... G06Q 10/083 705/26.1 |
| 2009/0289112 A1 | 11/2009 | Bonalle et al. |
| 2009/0307060 A1 | 12/2009 | Merz et al. |
| 2010/0019030 A1 | 1/2010 | Monk |
| 2010/0036758 A1 | 2/2010 | Monk |
| 2010/0049588 A1 | 2/2010 | Debow |
| 2010/0057553 A1 | 3/2010 | Ameiss et al. |
| 2010/0057619 A1 | 3/2010 | Weller et al. |
| 2010/0063895 A1 | 3/2010 | Dominguez et al. |
| 2010/0070424 A1 | 3/2010 | Monk |
| 2010/0094752 A1 | 4/2010 | Heath |
| 2010/0145744 A1 | 6/2010 | Beck et al. |
| 2010/0153267 A1 | 6/2010 | Ghaidan et al. |
| 2010/0174644 A1 | 7/2010 | Rosano et al. |
| 2010/0191594 A1 | 7/2010 | White et al. |
| 2010/0228669 A1 | 9/2010 | Karim |
| 2010/0228672 A1 | 9/2010 | Karim |
| 2010/0248779 A1 | 9/2010 | Phillips et al. |
| 2010/0258620 A1 | 10/2010 | Torreyson et al. |
| 2010/0280893 A1 | 11/2010 | Hogg et al. |
| 2010/0280910 A1 | 11/2010 | Hogg et al. |
| 2010/0293093 A1 | 11/2010 | Karpenko |
| 2010/0299230 A1 | 11/2010 | Patterson et al. |
| 2010/0299253 A1 | 11/2010 | Patterson |
| 2010/0299254 A1 | 11/2010 | Patterson |
| 2010/0301114 A1 | 12/2010 | Lo Faro et al. |
| 2010/0312698 A1 | 12/2010 | Bonalle et al. |
| 2010/0325041 A1 | 12/2010 | Berardi et al. |
| 2010/0325053 A1 | 12/2010 | Hogg et al. |
| 2010/0332393 A1 | 12/2010 | Weller et al. |
| 2011/0055057 A1 | 3/2011 | Vasten |
| 2011/0055076 A1 | 3/2011 | Trifiletti et al. |
| 2011/0068170 A1 | 3/2011 | Lehman |
| 2011/0078081 A1 | 3/2011 | Pirzadeh et al. |
| 2011/0087592 A1 | 4/2011 | van der Veen et al. |
| 2011/0093387 A1* | 4/2011 | Fuerstenberg ....... G06Q 20/102 705/40 |
| 2011/0125637 A1 | 5/2011 | Kalra et al. |
| 2011/0131128 A1* | 6/2011 | Vaananen ............ G06Q 20/10 705/37 |
| 2011/0153500 A1 | 6/2011 | DiGioacchino |
| 2011/0276420 A1 | 11/2011 | White et al. |
| 2011/0288993 A1 | 11/2011 | Bonalle et al. |
| 2011/0295743 A1 | 12/2011 | Patterson |
| 2012/0011012 A1 | 1/2012 | Hogg et al. |
| 2012/0011065 A1 | 1/2012 | Winfield-Chislett et al. |
| 2012/0029999 A1 | 2/2012 | Hogg et al. |
| 2012/0030066 A1 | 2/2012 | Stringfellow et al. |
| 2012/0047075 A1 | 2/2012 | Balistierri et al. |
| 2012/0094639 A1 | 4/2012 | Carlson et al. |
| 2012/0116933 A1 | 5/2012 | Matthews et al. |
| 2012/0130731 A1 | 5/2012 | Canetto |
| 2012/0130783 A1 | 5/2012 | Hogg et al. |
| 2012/0130831 A1 | 5/2012 | Hogg et al. |
| 2012/0130896 A1 | 5/2012 | Hogg et al. |
| 2012/0166334 A1 | 6/2012 | Kimberg et al. |
| 2012/0203658 A1 | 8/2012 | Monk |
| 2012/0203689 A1 | 8/2012 | Parvis |
| 2012/0254020 A1 | 10/2012 | Debow |
| 2012/0254028 A1 | 10/2012 | Elgar |
| 2012/0265683 A1 | 10/2012 | da Silva et al. |
| 2012/0296824 A1* | 11/2012 | Rosano ............... G06Q 20/102 705/44 |
| 2012/0323733 A1 | 12/2012 | Hernandez et al. |
| 2012/0323734 A1 | 12/2012 | Dominguez et al. |
| 2013/0006781 A1 | 1/2013 | Hogg et al. |
| 2013/0030972 A1 | 1/2013 | DiGioacchino |
| 2013/0054338 A1 | 2/2013 | Merz |
| 2013/0054340 A1 | 2/2013 | Lehman |
| 2013/0066775 A1 | 3/2013 | Milam |
| 2013/0151410 A1 | 6/2013 | Babi |
| 2013/0166402 A1 | 6/2013 | Parento et al. |
| 2013/0185132 A1 | 7/2013 | Hogg et al. |
| 2013/0204886 A1* | 8/2013 | Faith .................. G06Q 30/0631 707/756 |
| 2013/0254105 A1 | 9/2013 | Monk |
| 2013/0282565 A1 | 10/2013 | Barta et al. |
| 2013/0290119 A1 | 10/2013 | Howe et al. |
| 2014/0019332 A1 | 1/2014 | Boyle et al. |
| 2014/0025580 A1 | 1/2014 | Bacastow |
| 2014/0032409 A1* | 1/2014 | Rosano ............... G06Q 20/401 705/44 |
| 2014/0058924 A1 | 2/2014 | Kottmeier, Jr. et al. |
| 2014/0081857 A1 | 3/2014 | Bonalle et al. |
| 2014/0101034 A1 | 4/2014 | Tanner et al. |

OTHER PUBLICATIONS

"Debit Cards—Apply for a Bank Debit Card from Bank of America", www.bankofamerica.com, https://www.bankofamerica.com/deposits/checking/debit-cards.go, (Accessed Jun. 12, 2014), 2 pages.

"Debit Cards—Checking Accounts—Chase", www.chase.com, https://www.chase.com/checking/debit-cards, (Accessed Jun. 12, 2014), 1 page.

"Credit Cards Services—Chase Credit Cards", www.chase.com, https://www.chase.com/credit-cards/servicing, (Accessed Jun. 12. 2014), 1 page.

"Prepaid Cards—America Express", www.americanexpress.com, https://www.americanexpress.com/us/content/prepaid/reloadable-cards.html, (Accessed Jun. 12, 2014), 1 page.

"America Express—Credit Cards, Rewards, Travel and Business Services", www.americanexpress.com, https://www.americanexpress.com, (Accessed Jun. 12, 2004), 1 page.

"Citibank Debit Card—Citibank online", www.online.citibank.com, https://online.citibank.com/US/JRS/pands/detail.do.?ID=OnlineState, (Accessed Jun. 12, 2014), 2 pages.

"Citi", www.online.citibank.com, https://online.citibank.com/US/Welcome.c, (Accessed Jun. 12, 2014), 1 page.

"Visa Could Be Handing Out Your New Credit Or Debit Card Number Before You Even Receive It", www.consumerist.com, http://consumerist.com/2012/12/13/visa-could-be-handing-out-your-new-credit-or-debit-card-number-before-you-even-receive-it/, (Accessed May 22, 2014), 4 pages.

"The MasterCard Automatic Billing Updater", www.mastercard.com, http://www.mastercard.com/us/merchant/pdf/MasterCard_Automatic_Billing_Updater_Sell_Sheet.pdf, (Accessed May 22, 2014), 2 pages.

"Passomatic", www.passomatic.com, http://launch.passomatic.com, (Accessed May 22, 2014), 2 pages.

"Visa Account Updater for Merchants", www.visa.com, http://usa.visa.com/download/merchants/visa-account-updater-product-information-fact-sheet-for-merchants.pdf, (Accessed May 22, 2014), 2 pages.

"Visa Account Updater (VAU)", www.burlingtonbankcard.com, https://www.burlingtonbankcard.com/home/articles/visa-account-updater-vau, (Accessed May 22, 2014), 2 pages.

"Account Updater", www.chasepaymentech.com, https://www.chasepaymentech.com/account_updater.html, (Accessed May 22, 2014), 2 pages.

(56) References Cited

OTHER PUBLICATIONS

"Card Account Updater", www.merch.bankofamerica.com., http://merch.bankofamerica.com/card-account-updater-overview;jsessionid=466468ECB27ACD7C32F2P13F7E68C2E9, (Accessed May 22, 2014), 2 pages.

* cited by examiner

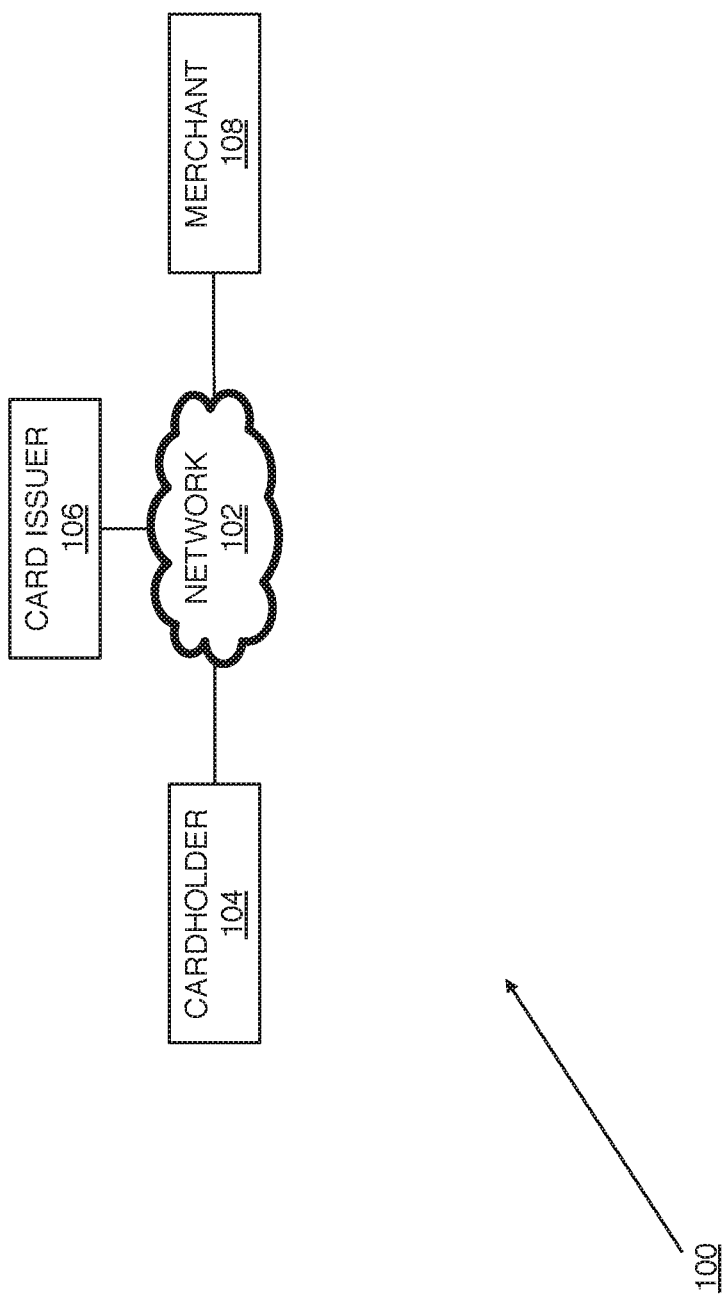

PAYMENT INFORMATION TECHNOLOGIES

CROSS-REFERENCE TO RELATED APPLICATIONS

The present application claims priority to U.S. Provisional Patent Application Ser. No. 61/757,224, filed on Jan. 27, 2013, which is herein fully incorporated by reference for all purposes.

BACKGROUND

In the present disclosure, where a document, an act and/or an item of knowledge is referred to and/or discussed, then such reference and/or discussion is not an admission that the document, the act and/or the item of knowledge and/or any combination thereof was at the priority date, publicly available, known to the public, part of common general knowledge and/or otherwise constitutes prior art under the applicable statutory provisions; and/or is known to be relevant to an attempt to solve any problem with which the present disclosure may be concerned with. Further, nothing is disclaimed.

Many people purchase goods and/or services online from merchants, such as Amazon®, Target®, and others. Such purchases are typically made via the merchants' websites and/or mobile apps using payment card information, such as credit card information and/or debit card information. In order to make such shopping experience simpler, many of such merchants optionally allow for the payment card information to be saved on the merchants' computer systems for future use. Therefore, based on the customers' sign in into the merchants' systems, such as via provision of an email address and/or a password, the payment card information is readily available for authorizing payment. However, despite such functionality, there are many drawbacks.

A person's payment card information is often stolen, misused, lost, expired, and/or updated. Consequently, new payment card information is issued to the person and the old payment card information is deactivated. The new payment card information usually includes a new card number, a new card expiration date, and/or a new card security code. Accordingly, if the person had the old payment card information previously saved on some merchant's computer system, then, in order to make another purchase through that merchant, the person typically has to manually enter the new payment card information into that merchant's computer system. Although such steps are relatively minimal for a single merchant, cumulatively, this process becomes tedious, time consuming, emotionally draining, and/or inconvenient if the person must repeat this process for many merchants. Such process becomes even more tedious, time consuming, emotionally draining, and/or inconvenient when performed at different times for different merchants because the user can misplace and/or forget merchant related sign in information and/or have the new payment card information stolen, misused, lost, expired, and/or updated in the interim.

Moreover, the person may not remember every website and/or app that needs to be updated and at least with paying bills online, such as utility bills, entertainment bills, and/or others, the person may only find out about providing new payment card information when the merchant contacts the person for lack of payment. Such state of being hardship not only for the person, but also for the merchant who has to dedicate resources for tracking down the customer for the lack of payment and/or ensuring that the customer actually pays. Also, such forgetfulness can lead to potential negative impact on the person's credit score.

Although online payment services, such as Paypal®, can somewhat mitigate the above, many merchants avoid using such services at least due to competition, security, added complexity, more computer infrastructure, additional service and/or transaction fees, which cut into the merchants' profits.

BRIEF SUMMARY

The present disclosure may address at least one of the above. However, the present disclosure may also prove useful to other technical areas. Therefore, the claims should not be construed as necessarily limited to addressing any of the above.

According to an example embodiment of the present disclosure a method is provided. The method includes maintaining, via a payment card issuer computer system, first payment card information for a cardholder. The method includes processing, via the system, a first card not present transaction between the cardholder and a merchant. The first transaction based at least in part on the first information. The method includes generating, via the system, second payment card information for the cardholder. The second information replacing the first information for subsequent use via the cardholder. The method includes receiving, via the system, an input from the cardholder. The input indicating the merchant. The input based at least in part on the second information replacing the first information. The method includes sending, via the system, the second information to the merchant based at least in part on the input. The method includes processing, via the system, a second card not present transaction between the cardholder and the merchant. The second transaction based at least in part on the second information after the sending.

According to another example embodiment of the present disclosure a method is provided. The method includes maintaining, via a payment card issuer computer system, first payment card information for a cardholder. The first information associated with a transaction history. The method includes processing, via the system, a first card not present transaction between the cardholder and a merchant. The first transaction based at least in part on the first information. The history listing the first transaction. The method includes generating, via the system, second payment card information for the cardholder. The second information replacing the first information for subsequent use via the cardholder. The method includes selecting, via the system, the merchant from the history based at least in part on the first transaction. The selecting based at least in part on the second information replacing the first information. The method includes sending, via the system, the second information to the merchant based at least in part on the selecting. The method includes processing, via the system, a second card not present transaction between the cardholder and the merchant. The second transaction based at least in part on the second information after the sending.

The present disclosure may be embodied in the form illustrated in the accompanying drawings. However, attention is called to the fact that the drawings are illustrative. Variations are contemplated as being part of the disclosure, limited only by the scope of the claims.

BRIEF DESCRIPTION OF THE DRAWINGS

The accompanying drawings illustrate example embodiments of the present disclosure. Such drawings are not to be construed as necessarily limiting the disclosure. Like numbers and/or similar numbering scheme can refer to like and/or similar elements throughout.

FIG. 1 shows an example embodiment of a network diagram according to the present disclosure.

DETAILED DESCRIPTION OF THE PREFERRED EMBODIMENTS

Figure 2A:
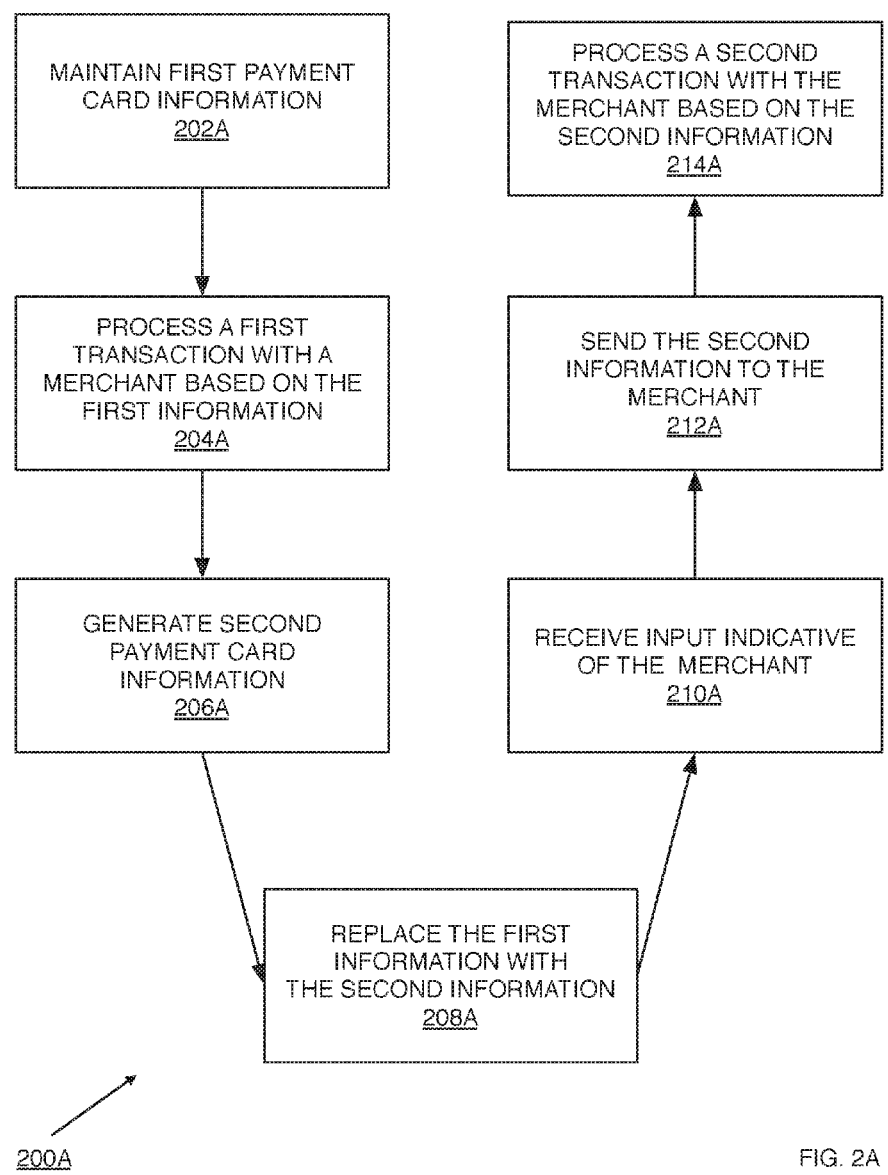
FIG. 2A shows an example embodiment of a process for using payment information according to the present disclosure.

The present disclosure is now described more fully with reference to the accompanying drawings, in which example embodiments of the present disclosure are shown. The present disclosure may, however, be embodied in many different forms and should not be construed as necessarily being limited to the example embodiments disclosed herein. Rather, these example embodiments are provided so that the present disclosure is thorough and complete, and fully conveys the concepts of the present disclosure to those skilled in the relevant art. In addition, features described with respect to certain example embodiments may be combined in and/or with various other example embodiments. Different aspects and/or elements of example embodiments, as disclosed herein, may be combined in a similar manner. Further, some example embodiments, whether individually and/or collectively, may be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity in any manner.

The terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer, or section discussed below could be termed a second element, component, region, layer, or section without departing from the teachings of the present disclosure.

The terminology used herein is for describing particular embodiments only and is not intended to be necessarily limiting of the present disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof. Further, alternate terminology should not be limited necessarily as exclusionary, but can be inclusionary as well.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Unless otherwise defined, all terms used herein, including technical and scientific terms, have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

As used herein, the term "about" and/or "substantially" refers to an up to and including a +/−10% variation from the nominal value/term. Such variation is always included in any given value/term provided herein, whether or not such variation is specifically referred thereto.

If any disclosures are incorporated herein by reference and such disclosures conflict in part and/or in whole with the present disclosure, then to the extent of conflict, and/or broader disclosure, and/or broader meaning of terms, the present disclosure controls. If such disclosures conflict in part and/or in whole with one another, then to the extent of conflict, the later-dated disclosure controls.

FIG. 1 shows an example embodiment of a network environment according to the present disclosure. An environment 100 includes a network 102, a cardholder 104, a card issuer 106, and a merchant 108.

Network 102 includes a plurality of nodes, such as a collection of computers and/or other hardware interconnected by communication channels, which allow for sharing of resources and/or information. Such interconnection can be direct and/or indirect. Network 102 can be wired and/or wireless. Network 102 can allow for communication over short and/or long distances. Network 102 can operate via at least one network protocol, such as Ethernet, a Transmission Control Protocol (TCP)/Internet Protocol (IP), and so forth. Network 102 can have any scale, such as a personal area network, a local area network, a home area network, a storage area network, a campus area network, a backbone network, a metropolitan area network, a wide area network, an enterprise private network, a virtual private network, a virtual network, a satellite network, a computer cloud network, an internetwork, a cellular network, and so forth. Network 102 can be and/or include an intranet and/or an extranet. Network 102 can be and/or include Internet. Network 102 can include other networks and/or allow for communication with other networks, whether sub-networks and/or distinct networks, whether identical and/or different from network 102. Network 102 can include hardware, such as a network interface card, a repeater, a hub, a bridge, a switch and/or a firewall. Network 102 can be operated, directly and/or indirectly, by and/or on behalf of one and/or more entities, irrespective of any relation to cardholder 104, card issuer 106, and/or merchant 108.

Network 102 can include a payment card association network, such as Visa® network, MasterCard® network, American Express® network, Discover® network, and others. The payment card association network serves as a link between card issuer 106, which acts on behalf of cardholder 104, and an acquirer, such as an acquiring bank, which acts on behalf of merchant 108. An operator of the payment card association network, such as Visa®, MasterCard®, American Express®, Discover®, and/or others, can set a transaction term for merchant 108, card issuing 106, and/or the acquirer. The payment card association network can be operated by an independent company and/or one company may operate multiple networks.

Cardholder 104 operates a computer, which can be a hardware and/or software server, a workstation, a desktop, a laptop, a tablet, a mobile phone, a mainframe, a supercomputer, a server farm, and so forth. The computer can be operated, directly and/or indirectly, by and/or on behalf of cardholder 104. The computer can be touchscreen and/or non-touchscreen. The computer can include and/or be part of another computer system and/or cloud network. The computer can run any type of operating system (OS), such as iOS®, Windows®, Android®, Unix®, Linux® and/or others. The computer can include and/or be coupled to an input device, such as a mouse, a keyboard, a camera, whether forward-facing and/or back-facing, an accelerometer, a touchscreen, and/or a microphone, and/or an output device, such as a display, a speaker, and/or a printer. The computer is in communication with network 102, such as directly and/or indirectly. Such communication can be via a software application, a mobile app, a browser, an OS, and/or any combination thereof. The computer can include circuitry for global positioning determination, such as via a global positioning system (GPS), a signal triangulation system, and so forth. The computer can be equipped with near-field-communication (NFC) circuitry.

Card issuer 106 operates a computer, which can be a hardware and/or software server, a workstation, a desktop, a laptop, a tablet, a mobile phone, a mainframe, a supercomputer, a server farm, and so forth. The computer can be operated, directly and/or indirectly, by and/or on behalf of card issuer 106. The computer can be touchscreen and/or non-touchscreen. The computer can include and/or be part of another computer system and/or cloud network. The computer can run any type of OS, such as iOS®, Windows®, Android®, Unix®, Linux® and/or others. The computer can include and/or be coupled to an input device, such as a mouse, a keyboard, a camera, whether forward-facing and/or back-facing, an accelerometer, a touchscreen, and/or a microphone, and/or an output device, such as a display, a speaker, and/or a printer. The computer is in communication with network 102, such as directly and/or indirectly. Such communication can be via a software application, a mobile app, a browser, an OS, and/or any combination thereof. The computer can include circuitry for global positioning determination, such as via GPS, a signal triangulation system, and so forth. The computer can be equipped with NFC circuitry. The computer can run a database, such as a relational database, which contains card issuing information and/or cardholder information.

Merchant 108 operates a computer, which can be a hardware and/or software server, a workstation, a desktop, a laptop, a tablet, a mobile phone, a mainframe, a supercomputer, a server farm, and so forth. The computer can be operated, directly and/or indirectly, by and/or on behalf of card issuer 106. The computer can be touchscreen and/or non-touchscreen. The computer can include and/or be part of another computer system and/or cloud network. The computer can run any type of OS, such as iOS®, Windows®, Android®, Unix®, Linux® and/or others. The computer can include and/or be coupled to an input device, such as a mouse, a keyboard, a camera, whether forward-facing and/or back-facing, an accelerometer, a touchscreen, and/or a microphone, and/or an output device, such as a display, a speaker, and/or a printer. The computer is in communication with network 102, such as directly and/or indirectly. Such communication can be via a software application, a mobile app, a browser, an OS, and/or any combination thereof. The computer can include circuitry for global positioning determination, such as via GPS, a signal triangulation system, and so forth. The computer can be equipped with NFC circuitry. The computer can run a database, such as a relational database, which contains payment information.

Cardholder 104 is in communication with network 102, such as direct, indirect, encrypted, unencrypted, and others. Cardholder 104 is in selective communication, such as direct, indirect, encrypted, unencrypted, and others, with at least one of card issuer 106 and merchant 108 via network 102.

Cardholder 104 includes an individual who makes purchases via a payment card. That individual can be a consumer and/or a legal entity, such as an organization, a a company, a partnership, and/or others. Cardholder 104 is responsible for charges made onto the payment card.

The payment card includes a card which can be used by cardholder 104 and accepted by merchant 108 to make a payment for a purchase and/or in payment of some other obligation. Such purchase and/or obligation can be for a good and/or a service. The payment card includes at least one of a credit card, a debit card, an automatic teller machine (ATM) card, a charge card, a stored-value card, a fleet card, a gift card, a scrip, an electronic purse, an electronic money wallet, a crypto-currency wallet, a virtual card, and/or others. Note that in some embodiments, a physical card may be absent, but a value is associated with the consumer based at least in part on some form of credit system, such as Hawala. Further, note that the payment card can include any information storage medium, whether physical and/or virtual, such as paper, metal, wood, rubber, computer memory, and/or others. For example, the card can include plastic items, paper items, metal items, wood items, rubber items, quick response (QR) codes depicted on an item, whether physically and/or electronically, information displayed on electronic mobile devices, wearable computers, and/or others.

Card issuer 106 is in communication with network 102, such as direct, indirect, encrypted, unencrypted, and others. Card issuer 106 is in selective communication, such as direct, indirect, encrypted, unencrypted, and others, with at least one of cardholder 104 and merchant 108 via network 102. For example, card issuer 106 can communicate with the acquirer of merchant 108 regarding merchant 108. Also for example, card issuer 106 can communicate with cardholder 104 via email.

Card issuer 106 includes a financial entity, such as a bank, like Chase®, Bank of America®, American Express®, Discover®, TD Bank®, and/or others, and/or any other organization that issued the payment card to cardholder 104. Card issuer 106 bills cardholder 104 for repayment and bears a risk that the payment card is used fraudulently. Cardholder 104 is responsible for repaying after making a purchase via the payment card issued via card issuer 106. Card issuer 106 can issue an offshore payment card.

The acquirer includes a financial entity, which accepts and/or processes payment card transactions for merchant 108, including crediting an account of merchant 108 for a value charged to the payment card minus any relevant fees. Such accepting and/or processing is for a good and/or a service offered via merchant 108 to cardholder 104.

Merchant 108 is in communication with network 102, such as direct, indirect, encrypted, unencrypted, and others. Merchant 108 is in selective communication, such as direct, indirect, encrypted, unencrypted, and others, with at least one of cardholder 104 and card issuer 106 via network 102. For example, merchant 108 is in communication with cardholder 104 via email. Also for example, merchant 108 is in communication with card issuer 106 via the acquirer of merchant 108. Merchant 108 includes an individual, an organization, and/or a business accepting payment card payments for a good and/or a service sold to cardholder 104, whether directly and/or indirectly. Merchant 108 includes a for-profit entity, a non-for-profit entity, a government agency, and/or others. Merchant 108 includes an online merchant, a brick-and-mortar merchant, and/or any combination thereof. Note that any amount of merchants 108 can be used, as described herein. Note that card issuer 106 can be merchant 108 and/or merchant 108 can include card issuer 104. Note that cardholder 104 can be merchant 108 and/or merchant 108 can be cardholder 104.

FIG. 2A shows an example embodiment of a process for using payment information according to the present disclosure. Some elements of this figure are described above. Thus, same and/or similar reference characters identify identical and/or like components described above and any repetitive detailed description thereof will hereinafter be omitted or simplified in order to avoid complication.

A process 200A includes a plurality of blocks 202A-214A. Process 200A can be performed in sequential numerical order and/or non-sequential numerical order. Process 200A is performed via card issuer 106. However, whether domestically and/or internationally, process 200A can be performed, facilitated for performance, and/or assisted in such performance via at least one entity, such as merchant 108, cardholder 104, the acquirer of merchant 108, an operator of the credit card transaction network, an independent sales organization reselling to merchant 108 services of the acquirer, an operator of a transaction network which implements electronic payment card transactions, an affinity partner, such as a retailer, a sports team, a university, a charity, a professional organization, lending its name to card issuer 106 for attracting a customer who has a strong relationship with the partner where the partner get paid a fee/balance percentage for each card issued using the partner name, and/or an insurance provider which underwriting various insurance protections offered as payment card perks, such as car rental insurance, hotel burglary insurance, and others.

In block 202A, card issuer 106 maintains, via a payment card issuer computer system, first payment card information for cardholder 104. The system can include a server and a database running on the server. The database contains information for a plurality of cardholders, which includes cardholder 104. The first information includes a payment card number, an expiration date, a security code, an operator of the payment card association network and/or other relevant information. Such maintenance can include at least one of issuing the first information, storage of the first information, securing of the first information from unauthorized access, sending a bill based at least in part on the first information, storing a transaction history associated with the first information, receiving a payment from cardholder 104 based at least in part on the first information, and/or other relevant types of maintenance. Note that the first information can vary based on payment card type.

In block 204A, card issuer 106 processes, via the system, a first transaction with merchant 108 based on the first information. The first transaction can be a card not present transaction, in which cardholder 104 is not in a same locale as merchant 108 during transacting. Such transactions include mail order transactions, telephone transactions, facsimile transactions, recurring transaction, and/or Internet/e-commerce transactions. However, note that the first transaction can be a card present transaction. The first transaction is between at least merchant 108 and cardholder 104. Such processing can include communicating with the acquirer, who acts on behalf of merchant 108, to facilitate payment to merchant 108 via the acquirer. Such processing can also include billing cardholder 104 based at least in part on payment to the acquirer and the first information. Such processing can also include receiving payment from cardholder 104 based on the billing and the first information. The first transaction can be a recurring transaction, an e-commerce transaction, and/or others.

In block 206A, card issuer 106 generates, via the system, second payment card information for cardholder 104. Such generation can be manual, such as via a phone operator of card issuer 106 running a payment information generation program, and/or automatic, such as via receiving a notification that the first information is insecure. The second information includes a payment card number, which can be different from the first information, an expiration date, which can be different from the first information, a security code, which can be different from the first information, an operator of the payment card association network, which can be different from the first information, and/or other relevant information. For example, card issuer 106 can issue a new payment card based on the second information to cardholder 104. Note that the second information can vary based on payment card type. Although the first information and the second information are for an identical payment card type, in some embodiments, the first information can be for a payment card of a first type and the second information can be for a payment card of a second type different from the first type.

In block 208A, card issuer 106 replaces, via the system, the first information with the second information for subsequent use via the cardholder. Such replacement can occur based at least in part on at least one of stolen first information, misused first information, lost first information, expired first information, updated first information, cardholder 104 request, and/or others. Such replacing can include deactivating the first information such that the first information cannot be subsequently used for purchasing.

In block 210A, card issuer 106 receives, via the system, an input from cardholder 104. The input indicates/implicates merchant 108 since cardholder 104 already transacted with merchant 108 and there is a chance that cardholder 104 will again transact with merchant 108 with the second information, such as a recurring transaction, a new e-commerce order, and/or others. The input is based at least in part on the second information replacing the first information, such as after the replacing has been noted by card issuer 106. For example, after the replacing has been confirmed via card issuer 106, cardholder 104 is provided with the transaction history via the system. Cardholder 104 can be allowed to provide the input whether based at least in part on the transaction history associated with the first information and/or manually entering a merchant identification, such as a name of merchant 108 and/or a date of transaction with merchant 108. The input can be via any input manner, such as a keyboard, a mouse, a microphone, a camera, and/or others. The input can include an alphanumeric text, a voice, an image, a symbol, and/or others. The text can identify merchant 108. For example, the text can include at least one of a name of merchant 108, an address of merchant 108, an electronic communication information of merchant 108, a spent amount of transaction with merchant 108, a geolocation of merchant 108, and a date of transaction with merchant 108. The input can be via selecting from a plurality of choices, such as merchant choices listed in the transaction history associated with the first information. The input can via selecting merchant 108 from other merchants based at least in part on the transaction history. The input can be via any element of a graphical user interface provided to cardholder 104 via card issuer 106. Some examples of such elements include a text box, a combo box, a radio button, a check box, a split button, a slider, a list box, a spinner, a drop-down list, a control menu, a pie menu, a ribbon, and/or others.

Note that card issuer 106 can maintain, via the system, the transaction history associated with the first information. Card issuer 106 can provide, via the system, a list to cardholder 104. The list includes a plurality of merchants. The merchants include merchant 108. The list is generated based at least in part on a computerized analysis of the history. The input is via selecting merchant 108 from the merchants based at least in part on the list. The analysis is based at least in part on at least one of a frequency of use, an amount per transaction, and a total amount spent per merchant.

In block 212A, card issuer 106 sends, via the system, the second information to merchant 108 based at least in part on the input. Card issuer 106 initiates a means of communication by which the second information is sent to merchant 108 without merchant 108 being informed by card issuer 106 of such sending prior to the sending. Although the sending is without merchant 108 specifically requesting for the second information, such configuration can be different in other embodiments. The second information can be sent in a direct and/or indirect manner. The second information can be sent in an encrypted and/or unencrypted manner. For sending, the second information can include alphanumeric, symbolic, audio, video, and/or other types of data. The second information can be sent in an original manner, such as how card issuer 106 stores the second information, and/or in an amended manner, such as specifically formatted manner and/or how merchant 108 desires such information.

Such means of communication can be via any communication technology, including a browser-based email, a client-based email, an instant message, a text message, a short message service (SMS), a chat, a voice chat, a web conferencing, a physical snail mail, a telephone, a facsimile, a webpage, a social media post, a social media message, a module-to-module message, a hypertext transfer protocol (HTTP and/or HTTPS), a file transfer protocol (FTP), and/or any other type of message sending technology. For example, card issuer 106 can send the second information via the electronic mail to merchant device, such as a computer and/or phone which is operated by and/or on behalf of merchant 108 via the Internet. The second information can include a message asking merchant 108 to update card holder 104 account on the merchant's computer with the updated card information, i.e., the second information. Alternatively, no message is sent along with the second information since by virtue of receiving the second information, merchant 108 can understand that an action to be taken is to update card holder 104 account on the merchant's computer. In another alternative embodiment, instead of sending the second information via the electronic mail, a link is sent via the electronic mail for which merchant 108 can click to access a webpage containing the second information to be retrieved. Alternatively, instead of a link, information directing merchant 108 to a specific web address/domain name can be sent for which merchant 108 can access to retrieve the second information. Further, merchant 108 can submit a preference list to card issuer 106. The preference list lists which means of sending is preferred so that card issuer 106 can send the second information via such preferred means. The preference list can be stored in an account on card issuer 106 computer either locally and/or remotely. In addition to communicating the second information to merchant 108, card issuer 106 can simultaneously, or thereafter, inform cardholder 104 that such information is, or has been, sent to merchant 108. Note that the second information can be sent by itself and/or with other information to merchant 108, such as the second information for other cardholders 104, general information, technical information, non-payment information for other cardholders 104, and/or others.

In block 214A, card issuer 106 processes, via the system, a second transaction with merchant 108 based on the second information after the sending. The second transaction can be a card not present transaction in which cardholder 104 is not in a same locale as merchant 108 during transacting. Such transactions include mail order transactions, telephone transactions, facsimile transactions, recurring transaction, and/or Internet/e-commerce transactions. However, second transaction can be a card present transaction. The second transaction is between at least merchant 108 and cardholder 104. Such processing can include communicating with the acquirer, who acts on behalf of merchant 108, to facilitate payment to merchant 108 via the acquirer. Such processing can also include billing cardholder 104 based at least in part on payment to the acquirer and the second information. Such processing can also include receiving payment from cardholder 104 based on the billing and the second information. The second transaction can be a recurring transaction, an e-commerce transaction, and/or others. The second transaction and the first transaction can relate to identical subject matter and/or be non-related.

For example, cardholders 104 purchase goods and/or services online from merchants 108, such as Amazon®, Target®, and others. Such purchases are typically made, whether via merchants' 108 websites and/or mobile apps, using payment card information, such as credit card information and/or debit card information. In order to make such shopping experience simpler, many merchants 108 optionally allow for the payment card information to be saved on merchants' 108 computer systems for future use. Therefore, based on cardholders' 104 signing-in into merchants' 108 systems, such as via provision of an email address and/or a password, the payment card information is readily available for authorizing payment. However, often, cardholder 104 payment card information, such as the first information, is stolen, misused, lost, expired, and/or updated. Consequently, new payment card information, such as the second information, is issued to cardholder 104 and the old payment card information, such as the first information, is deactivated. The new payment card information, such as the second information, usually includes a new card number, a new card expiration date, and/or a new card security code. Accordingly, if cardholder 104 had the old payment card information, such as the first information, previously saved on merchant 108 computer system, then, in order to make another purchase through that merchant 108, cardholder 104 typically has to manually enter the new payment card information, such as the second information, into that merchant's 108 computer system. Although such steps are relatively minimal for a single merchant 108, cumulatively, this process becomes tedious, time consuming, emotionally draining, and/or inconvenient if cardholder 104 must repeat this process for many merchants 108. Such process becomes even more tedious, time consuming, emotionally draining, and/or inconvenient when performed at different times for different merchants 108 because cardholder 104 can misplace and/or forget merchant 108 related sign in information and/or have the new payment card information, such as the second information, stolen, misused, lost, expired, and/or updated in the interim. Moreover, cardholder 104 may not remember every website and/or app that needs to be updated and at least with paying bills online, such as utility bills, entertainment bills, and/or others, cardholder 104 may only find out about providing new payment card information when merchant 108 contacts cardholder 104 for lack of payment. Such state of being hardship not only for cardholder 104, but also for merchant 108 who has to dedicate resources for tracking down cardholder 104 for the lack of payment and/or ensuring that cardholder 104 actually pays. Also, such forgetfulness can lead to potential negative impact on cardholder 104 credit score. Therefore, via cardholder 104 accessing card issuer 106 to send the new payment information, such as the second payment information, to merchant 108, cardholder 104 avoids manually entering the new payment information, such as the second information, into merchants 108 computer systems, while effectively saving time in a convenient manner, even if the new payment card information, such as the second information, stolen, misused, lost, expired, and/or updated in the interim. Further, cardholder 104 effectively avoids every website and/or app that needs to be updated and at least with paying bills online, such as utility bills, entertainment bills, and/or others. Likewise, merchant 108 can effectively avoid dedicating resources for tracking down cardholder 104 for the lack of payment and/or ensuring that cardholder 104 actually pays. Moreover, cardholder 104 can avoid such forgetfulness leading to potential negative impact on cardholder 104 credit score. Consequently, such technology effectively reduces a need for cardholder 104 to visit multiple merchant websites and update payment information on those sites piecemeal. In some embodiments, in order to reduce a likelihood of sensitive information, such as the second information, being intercepted, card issuer 106 sends the second information when cardholder 104 accesses card issuer 106 to update payment information for merchant 108.

Figure 2B:
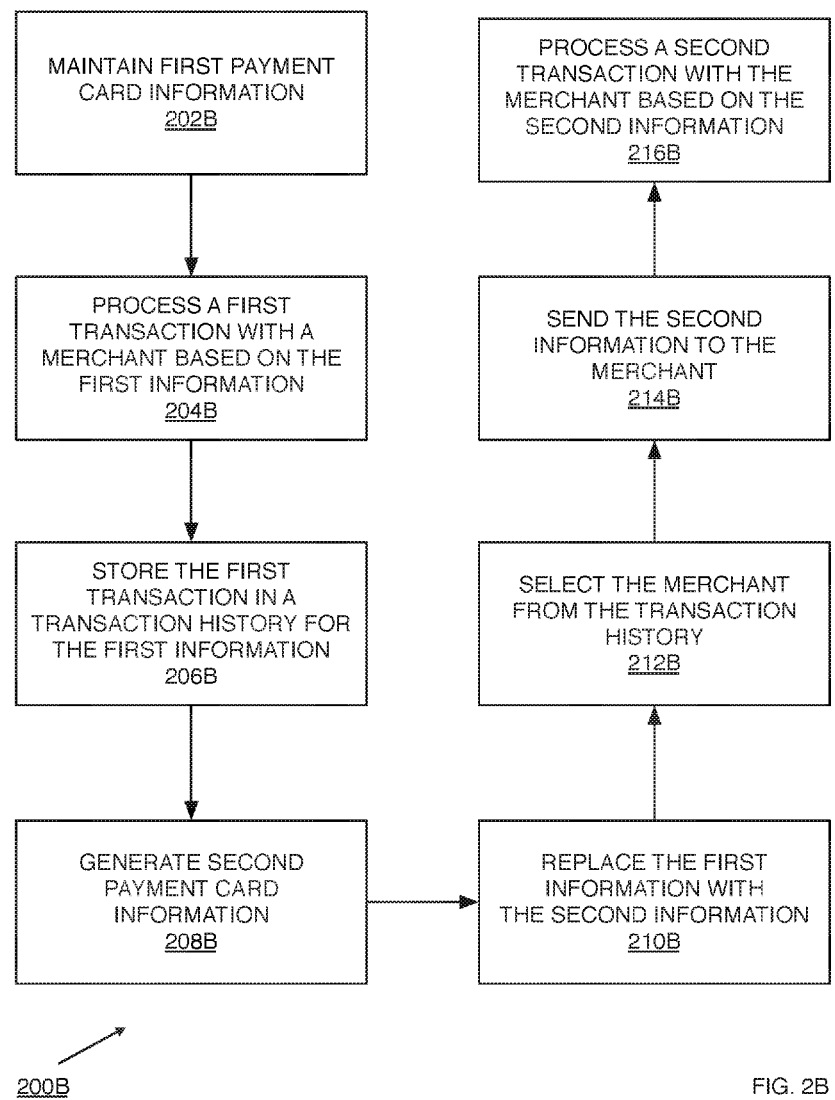
FIG. 2B shows an example embodiment of a process for using payment information according to the present disclosure.

FIG. 2B shows an example embodiment of a process for using payment information according to the present disclosure. Some elements of this figure are described above. Thus, same and/or similar reference characters identify identical and/or like components described above and any repetitive detailed description thereof will hereinafter be omitted or simplified in order to avoid complication.

A process 200B includes a plurality of blocks 202B-216B. Process 200B can be performed in sequential numerical order and/or non-sequential numerical order. Process 200B is performed via card issuer 106. However, whether domestically and/or internationally, process 200B can be performed, facilitated for performance, and/or assisted in such performance via at least one entity, such as merchant 108, cardholder 104, the acquirer of merchant 108, an operator of the credit card transaction network, an independent sales organization reselling to merchant 108 services of the acquirer, an operator of a transaction network which implements electronic payment card transactions, an affinity partner, such as a retailer, a sports team, a university, a charity, a professional organization, lending its name to card issuer 106 for attracting a customer who has a strong relationship with the partner where the partner get paid a fee/balance percentage for each card issued using the partner name, and/or an insurance provider which underwriting various insurance protections offered as payment card perks, such as car rental insurance, hotel burglary insurance, and others.

In block 202B, card issuer 106 maintains, via the system, the first information cardholder 104, as described herein. The first information is associated with the transaction history listing transactions between cardholder 104 and other merchants 108.

In block 204B, card issuer 106 processes, via the system, the first transaction between cardholder 104 and merchant 108, as described herein. The first transaction is based at least in part on the first information, such as charged according to the first information.

In block 206B, card issuer 106 stores, via the system, information about the first transaction in the transaction history, as described herein. The transaction history is for the first information such that the transaction history lists the first transaction.

In block 208B, card issuer 106 generates, via the system, the second information for cardholder 104, as described herein.

In block 210B, card issuer 106 replaces, via the system, the first information with the second information, as described herein.

In block 212B, card issuer 106 selects, via the system, merchant 108 from the transaction history based at least in part on the first transaction. The selecting indicates/implicates merchant 108 since cardholder 104 already transacted with merchant 108 and there is a chance that cardholder 104 will again transact with merchant 108 with the second information, such as a recurring transaction, a new e-commerce order, and/or others. The selecting is done manually, such as via an employee of card issuer 106, and/or automatically, via a computer program, which analyzes the transaction history for who to select in the history. Such analysis can be heuristic, deterministic, and/or others. Such analysis can be based at least in part on at least one of a frequency of use, such as how frequently has merchant 108 transacted with cardholder 106 for a selected time period in relation to other merchants listed in the transaction history, an amount per transaction, such as an average amount per transaction between cardholder 104 and merchant 108 in relation to other merchants listed in the transaction history, and a total amount spent per merchant, such as how much as cardholder 104 transacted with merchant 108 in relation to other merchants listed in the transaction history. The selecting is based at least in part on the second information replacing the first information, such as after the replacing has been noted by card issuer 106. For example, after the replacing has been confirmed via card issuer 106, selects merchant 108 based on the analysis above. The selecting can be via any selecting manner, such as a keyboard, a mouse, a microphone, a camera, and/or others. The selecting can include an alphanumeric text, a voice, an image, a symbol, and/or others. The selecting can be via selecting from a plurality of choices, such as merchant choices listed in the transaction history associated with the first information. The selecting can be via any element of a graphical user interface provided to cardholder 104 via card issuer 106. Some examples of such elements include a text box, a combo box, a radio button, a check box, a split button, a slider, a list box, a spinner, a drop-down list, a control menu, a pie menu, a ribbon, and/or others.

For example, card issuer 106 can computationally analyze the transaction history and generate a report based at least in part on such analysis. Such analysis can be based at least in part on at least one of a frequency of use, such as how frequently has merchant 108 transacted with cardholder 106 for a selected time period in relation to other merchants listed in the transaction history, an amount per transaction, such as an average amount per transaction between cardholder 104 and merchant 108 in relation to other merchants listed in the transaction history, and a total amount spent per merchant, such as how much as cardholder 104 transacted with merchant 108 in relation to other merchants listed in the transaction history. Resultantly, the report contains a list of merchants, which includes merchant 108. Card issuer 106 then provides the report, such as via a webpage, to cardholder 104 for review, such as via accessing the system of card issuer 106. Cardholder 104 can review the report and fully confirm, fully disconfirm, partially confirm, and/or partially disconfirm which merchants mentioned in the report that cardholder 104 desires to send the second information to. When cardholder 104 confirms at least merchant 108 during such review, then card issuer 106 sends the second information to merchant 108.

In block 214B, card issuer 106 sends, via the system, the second information to merchant 108 based at least in part on the selecting, as described herein.

In block 216B, card issuer 106 processes, via the system, a second card not present transaction between cardholder 104 and merchant 108, as described herein. The second transaction is based at least in part on the second information after the sending.

For example, cardholder 104 can manually select from the list and/or inform card issuer 106 which merchants 108 will receive the second information. The list can be obtained from card issuer 106. The list includes merchants 108 from which cardholder 104 previously purchased items/services from using the first information. Cardholder 104 can also select, based on merchant selection algorithms, for card issuer 106 to automatically select merchants, such as merchant 108, based on various criteria, such as prior spending history, most frequently used merchants based one or more time periods, money spent and/or every merchant ever used.

Upon selecting merchant(s) to which to send the second information, such as merchant 108, card issuer 106 sends data representing the second information to the merchant(s). Such data can include personal identifying information, which may be just the second payment information, contact information, personal identification information and/or first payment information for identifying the user on the merchant(s) computer system and/or any combination thereof. Upon receiving such data, whether immediately or after some time period, the merchant(s) associates, whether manually and/or automatically, the second information with cardholder 104 account at the merchant(s) computer system. Alternatively, the information is updated on merchant's end without merchant involvement and/or input.

In other embodiments, process 200B includes receiving, via the system, a message from merchant 108. The message confirming a receipt of the second information based at least in part on the sending. Process 200B further includes receiving, via the system, a message from merchant 108. The message confirming a storage of second information on a storage medium associated with merchant 108, such as owned via merchant 108. Process 200B further includes providing a software module via card issuer 106 to merchant 108 before the sending. The module is configured for receiving the second information based at least in part on the sending. Process 200B further includes receiving, via the system, an input from cardholder 104. The input modifying a selection of merchant 108 based at least in part on the selecting. For example, if, based on the computerized analysis, the system provided a list of merchants, with merchant 108 therein, to cardholder 104 and cardholder 104 desires to modify that list, such as via adding merchants thereto and/or removing merchants therefrom, then cardholder 104 can provide the input into the system to modify the list. However, if cardholder 104 is happy with contents of the list, then the system can receive an input from cardholder 104, which confirms the selecting. Note that cardholder 104 can elect other merchants, such as via checking off corresponding checkboxes in the transaction history and/or the list, who were not selected via the system. Such electing allows card issuer 106 to send the second information to those merchants.

Figure 3:
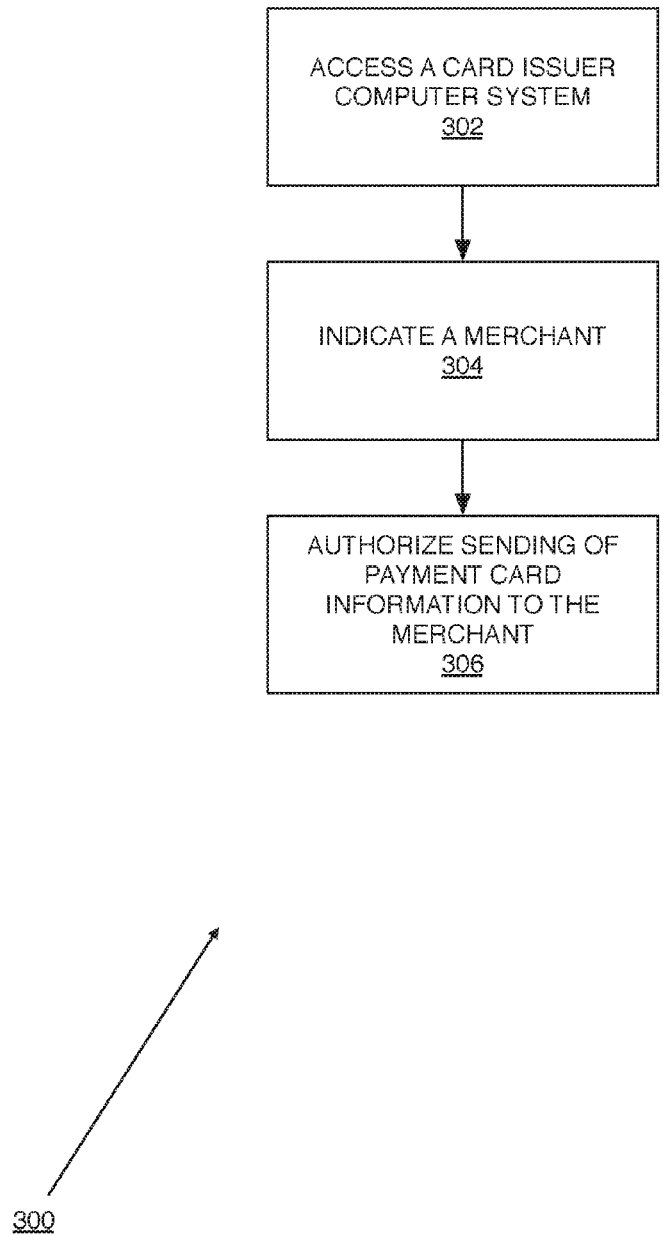
FIG. 3 shows an example embodiment of a process for disclosing payment information according to the present disclosure.

FIG. 3 shows an example embodiment of a process for disclosing payment information according to the present disclosure. Some elements of this figure are described above. Thus, same and/or similar reference characters identify identical and/or like components described above and any repetitive detailed description thereof will hereinafter be omitted or simplified in order to avoid complication.

A process 300 includes a plurality of blocks 302-306. Process 300 can be performed in sequential numerical order and/or non-sequential numerical order. Process 300 is performed via cardholder 104. However, whether domestically and/or internationally, process 300 can be performed, facilitated for performance, and/or assisted in such performance via at least one entity, such as merchant 108, card issuer 106, the acquirer of merchant 108, an operator of the credit card transaction network, an independent sales organization reselling to merchant 108 services of the acquirer, an operator of a transaction network which implements electronic payment card transactions, an affinity partner, such as a retailer, a sports team, a university, a charity, a professional organization, lending its name to card issuer 106 for attracting a customer who has a strong relationship with the partner where the partner get paid a fee/balance percentage for each card issued using the partner name, and/or an insurance provider which underwriting various insurance protections offered as payment card perks, such as car rental insurance, hotel burglary insurance, and others.

In block 302, cardholder 104 accesses the system of card issuer 106. Such accessing can be in any manner, whether secure and/or insecure, whether direct and/or indirect. For example, cardholder 104 can operate the computer of cardholder 104 and, over network 102, securely sign-in into the system of card issuer 104. In other embodiments, such access can be over phone, email, facsimile, in-person, social media, texting, messaging, chat, and/or others.

In block 302, cardholder 104 indicates merchant 108. Such indication allows cardholder 104 to select to which merchant 108 should card issuer 106 send the second information for subsequent use, which can be immediate. Such indication can be via textual, voice, image, symbolic and/or any other input. Such indication can be via cardholder 104 selecting merchant 108 from the transaction history. Such indication can be via cardholder 104 selecting merchant 108 from a list provided to cardholder 104 via card issuer 106 based at least in part on card issuer 106 analyzing the transaction history for various trends of cardholder 104.

In block 306, cardholder 104 authorizes card issuer 106 to send the second information from card issuer 106 to merchant 108. Such authorization can be via any manner, such as via a message prompt, a checkbox, and others. The authorization is requested, via the system. Note that in other embodiments, card issuer 106 sends the second information without authorization of cardholder 104.

Figure 4:
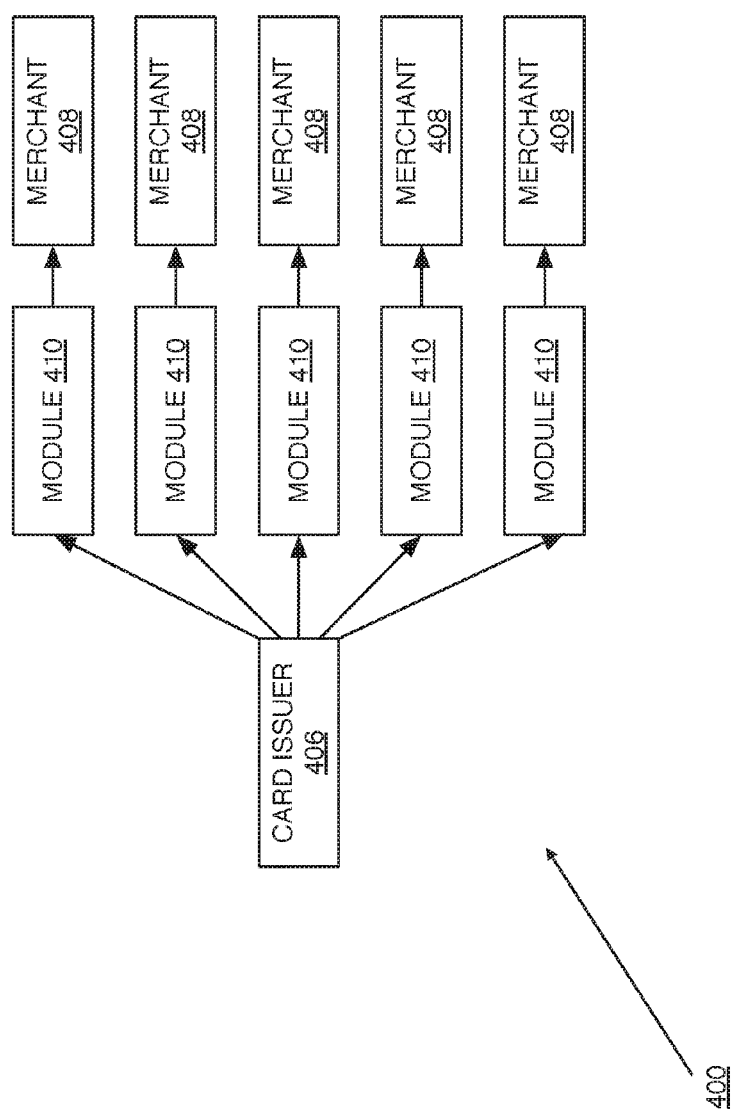
FIG. 4 shows an example embodiment of a communication diagram according to the present disclosure.

FIG. 4 shows an example embodiment of a communication diagram according to the present disclosure. Some elements of this figure are described above. Thus, same and/or similar reference characters identify identical and/or like components described above and any repetitive detailed description thereof will hereinafter be omitted or simplified in order to avoid complication.

Card issuer 406 provides a software module 410 to merchant 408 before card issuer 406 sends the second information to merchant 408. Module 410 configured for receiving the second information based at least in part on the sending of the second information via card issuer 406. For example, module 410 can communicate with the system of card issuer 406.

Note that module 410 is an example and card issuer 406 can provide merchant 408 with any logic, whether hardware, like a chip and/or circuitry, and/or software, like a software patch, a piece of code, and/or a program and/or any combination thereof. In some embodiments, the logic can be operative for retrofitting preexisting hardware and/or software on merchant's 408 end, irrespective of whether such hardware and/or software is merchant 408 specific, or be a new feature on the merchant's 408 end. This logic can provide for standardization of performance of such process for any, many and/or all merchants capable of payment processing according to the second information. The logic can allow for seamless updating of the second information data on the backend between card issuer 406 and merchants 408. The logic can include and/or allow for security measures, such as encryption, user questions, image matching, automated phone call, emails, text messages, card issuer 406 staff call and/or any combination thereof. The measures can be between cardholder 104 and card issuer 406 and/or card issuer 406 and merchant(s) 408. The logic and/or card issuer 406 independent of the logic can display a message confirming update of the second information when card issuer 406 accesses merchant 408(s) system(s).

In an embodiment, when cardholder 104 has at least two payment information accounts with one card issuer 406 accessible via one login, then cardholder 104 can send at least one of the at least two payment account data to merchant 408(s), as described herein. For example, cardholder 104 has credit cards X and Y accessible via one login at card issuer 406. Credit card X has been used more frequently than credit card Y as believed by cardholder 104. Cardholder 104 can access card issuer 406 to authorize card issuer 406 to transmit credit card data for X and Y to merchant(s) 408 that have charged either credit card so that each credit card information is accessible to merchant 408 that have charged the other card. For example, if card X has been used at merchants A, B and C and card Y has been used by A, B, D and E, then cardholder 104 can authorize card issuer 406 to transmit card X data to D and/or E and card Y data to C.

Figure 5:
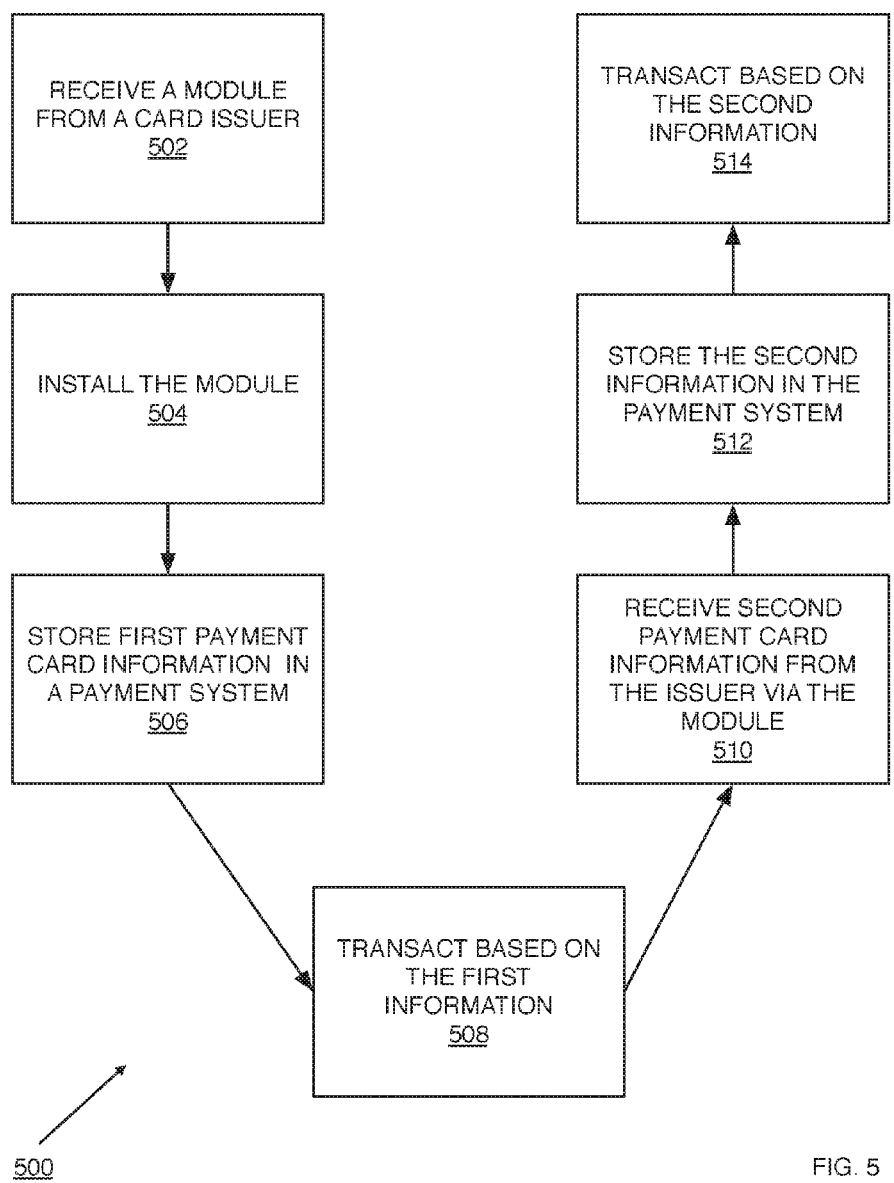
FIG. 5 shows an example embodiment of a process for module operation according to the present disclosure.

FIG. 5 shows an example embodiment of a process for module operation according to the present disclosure. Some elements of this figure are described above. Thus, same and/or similar reference characters identify identical and/or like components described above and any repetitive detailed description thereof will hereinafter be omitted or simplified in order to avoid complication.

A process 500 includes a plurality of blocks 502-514. Process 500 can be performed in sequential numerical order and/or non-sequential numerical order. Process 500 is performed via merchant 408. However, whether domestically and/or internationally, process 500 can be performed, facilitated for performance, and/or assisted in such performance via at least one entity, such as cardholder 104, card issuer 406, the acquirer of merchant 108, an operator of the credit card transaction network, an independent sales organization reselling to merchant 108 services of the acquirer, an operator of a transaction network which implements electronic payment card transactions, an affinity partner, such as a retailer, a sports team, a university, a charity, a professional organization, lending its name to card issuer 106 for attracting a customer who has a strong relationship with the partner where the partner get paid a fee/balance percentage for each card issued using the partner name, and/or an insurance provider which underwriting various insurance protections offered as payment card perks, such as car rental insurance, hotel burglary insurance, and others.

In block 502, merchant 408 receives module 410 from card issuer 406. Such receipt can be via any manner, whether physically and/or electronically. For example, such receipt can be via email, chat, file transfer, a physically mailed computer memory with module 410 thereon, source code, texting, multimedia messaging, a payment system update/upgrade, and/or others.

In block 504, merchant 408 installs module 410. Such installation depends on how module 410 was provided. For example, a self-extracting module 410 can be executed via merchant 408 and self-installed onto the payment system of merchant 408. Also for example, module 410 can be installed via an update/upgrade to the payment system of merchant 408.

In block 506, merchant 408 stores the first information in the payment system, as described herein. Note that block 506 can occur before block 502 and/or block 504.

In block 508, merchant 408 transacts with cardholder 106 based at least in part on the first information, as described herein. Note that block 506 can occur after block 508.

In block 510, merchant 408 receives the second information from card issuer 406 via module 410. Such receipt can be wired and/or wireless. Such receipt can be direct and/or indirect. Such receipt can be encrypted and/or unencrypted. Note that the second information can be sent en masse for a set of cardholders 104.

In block 512, merchant 408 stores the second information in the payment system. The payment system retrieves the second information from module 410 for storing in the payment system. The payment system can delete the second information from module 410 for security purposes after such retrieval. Module 410 can also be configured to self-delete the second information upon retrieval confirmation. Module 410 can also be configured to delete such information upon receiving a command from card issuer 406, which can be periodic. Module 410 can also be configured to contain a linked list, a stack, and/or a queue for retrieval of the second information in a first-in-first-out (FIFO) and/or first-in-last-out (FILO) manner. Module 410 can also be configured to decrypt the second payment information before provision to the payment system when the second information is encrypted via card issuer 406 at least before sending to module 410. Alternatively, module 410 sends the second information to the payment system immediately upon receipt of the second information from card issuer 406 and then self-deletes the second information upon receipt confirmation from the payment system.

In block 514, merchant 408 transacts with cardholder 104 based at least in part on the second information, as described herein.

Figure 6:
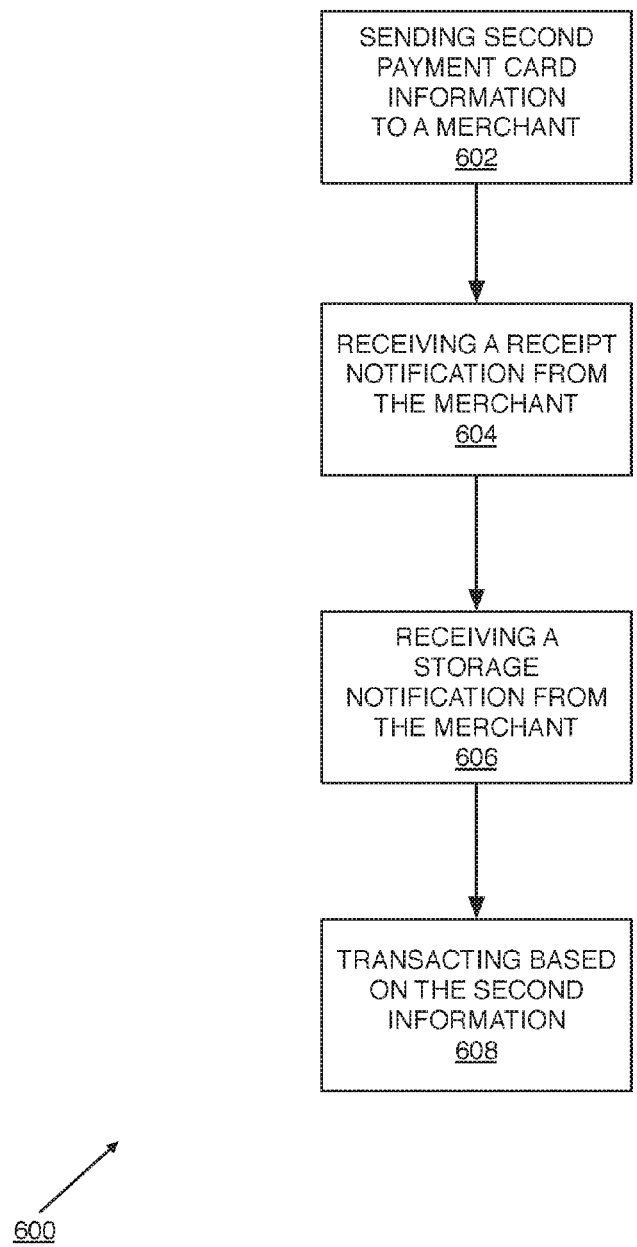
FIG. 6 shows an example embodiment of a process for receiving notifications according to the present disclosure.

FIG. 6 shows an example embodiment of a process for receiving notifications according to the present disclosure. Some elements of this figure are described above. Thus, same and/or similar reference characters identify identical and/or like components described above and any repetitive detailed description thereof will hereinafter be omitted or simplified in order to avoid complication.

A process 600 includes a plurality of blocks 602-608. Process 600 can be performed in sequential numerical order and/or non-sequential numerical order. Process 600 is performed via card issuer 106. However, whether domestically and/or internationally, process 600 can be performed, facilitated for performance, and/or assisted in such performance via at least one entity, such as cardholder 104, merchant 108, the acquirer of merchant 108, an operator of the credit card transaction network, an independent sales organization reselling to merchant 108 services of the acquirer, an operator of a transaction network which implements electronic payment card transactions, an affinity partner, such as a retailer, a sports team, a university, a charity, a professional organization, lending its name to card issuer 106 for attracting a customer who has a strong relationship with the partner where the partner get paid a fee/balance percentage for each card issued using the partner name, and/or an insurance provider which underwriting various insurance protections offered as payment card perks, such as car rental insurance, hotel burglary insurance, and others.

In block 602, card issuer 104 sends, via the system, the second information to merchant 108, as described herein.

In block 604, card issuer 104 receives, via the system, a receipt notification message from merchant 108. The message confirms a receipt of the second information based at least in part on the sending. The message can be sent from merchant 108 via module 410. The message can be sent from merchant 108 via another communication means, such as email, fax, texting, chatting, file transfer, facsimile, physical letter, and/or others.

In block 606, card issuer 104 receives, via the system, a storage notification message from merchant 108. The message confirms a storage of the second information based at least in part on the sending. The message can be sent from merchant 108 via module 410. The message can be sent via the payment system of merchant 108. The message can be sent from merchant 108 via another communication means, such as email, fax, texting, chatting, file transfer, facsimile, physical letter, and/or others. The storage of the second information on a storage medium associated with merchant 108. The storage medium can be digital and/or analog. For example, the storage medium can include computer memory, paper records, and/or others.

In block 608, card issuer 104 facilitates transacting between cardholder 104 and merchant 108 based at least in part on the second information, as described herein. For example, such facilitation can include processing the second transaction with merchant 108 based at least in part on the second information.

Figure 7:
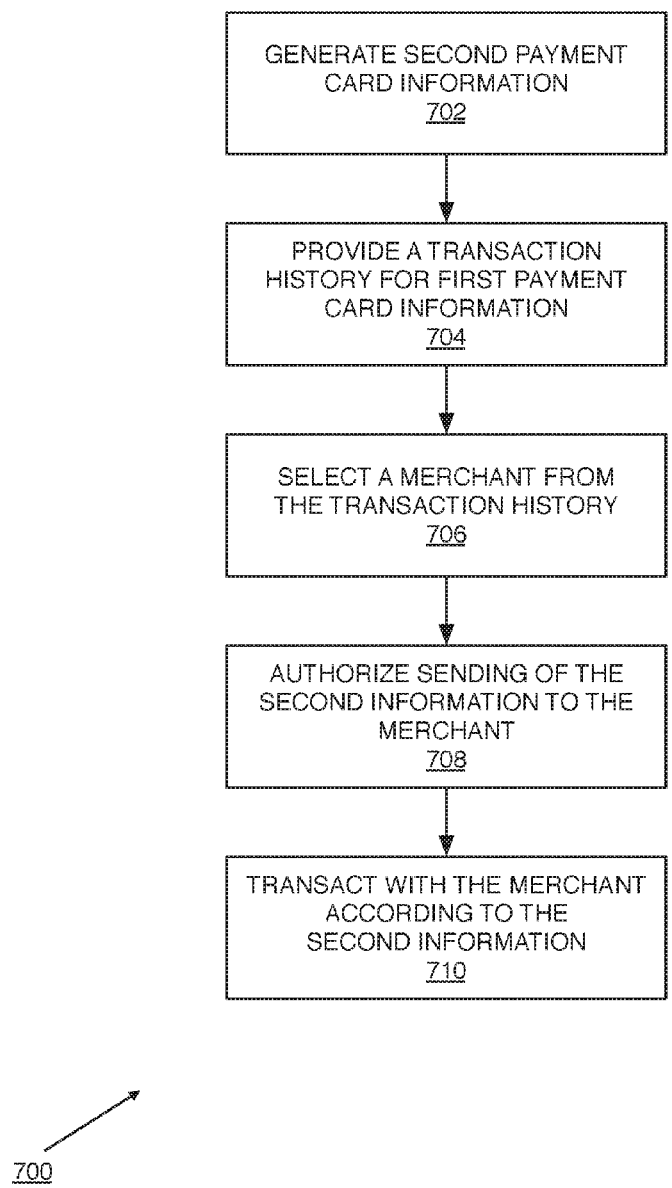
FIG. 7 shows an example embodiment of a process for disclosing payment information according to the present disclosure.

FIG. 7 shows an example embodiment of a process for disclosing payment information according to the present disclosure. Some elements of this figure are described above. Thus, same and/or similar reference characters identify identical and/or like components described above and any repetitive detailed description thereof will hereinafter be omitted or simplified in order to avoid complication.

A process 700 includes a plurality of blocks 702-710. Process 700 can be performed in sequential numerical order and/or non-sequential numerical order. Process 700 is performed via card issuer 106. However, whether domestically and/or internationally, process 700 can be performed, facilitated for performance, and/or assisted in such performance via at least one entity, such as cardholder 104, merchant 108, the acquirer of merchant 108, an operator of the credit card transaction network, an independent sales organization reselling to merchant 108 services of the acquirer, an operator of a transaction network which implements electronic payment card transactions, an affinity partner, such as a retailer, a sports team, a university, a charity, a professional organization, lending its name to card issuer 106 for attracting a customer who has a strong relationship with the partner where the partner get paid a fee/balance percentage for each card issued using the partner name, and/or an insurance provider which underwriting various insurance protections offered as payment card perks, such as car rental insurance, hotel burglary insurance, and others.

In block 702, card issuer 106 generates the second information, as described herein.

In block 704, card issuer 106 provides the transaction history for the first information to cardholder 104, as described herein. Such provision is visual, but can be auditory, alphanumeric, symbolic, and others. For example, such provision can be via a liquid crystal display (LCD). Such provision can be requested via cardholder 104 from card issuer 106, such as via a webpage. Such provision can be mandated onto cardholder 104 via card issuer 106, such as via a webpage.

In block 706, card issuer 106 selects merchant 108 from the transaction history based at least in part on computerized analysis of the transaction history, as described herein. Note that card issuer 106 can also select no merchants at all. Further, note that card issuer 106 can select a plurality of merchants, which can include merchant 108. The merchants can be ranked/rated, as described herein. Note that such rankings/ratings can be selectively sorted via cardholder 104.

In block 708, card issuer 106 receives authorization from cardholder 104 to send the second information to merchants, which can include merchant 108, as selected via card issuer 106 and/or cardholder 104. Such authorization can be biometric, alphanumeric, symbolic, and others. Such authorization can be via any visual and/or communication means described herein.

In block 710, card issuer 106 facilitates transacting between cardholder 104 and merchant 108 based at least in part on the second information, as described herein. For example, such facilitation can include processing the second transaction with merchant 108 based at least in part on the second information.

Figure 8:
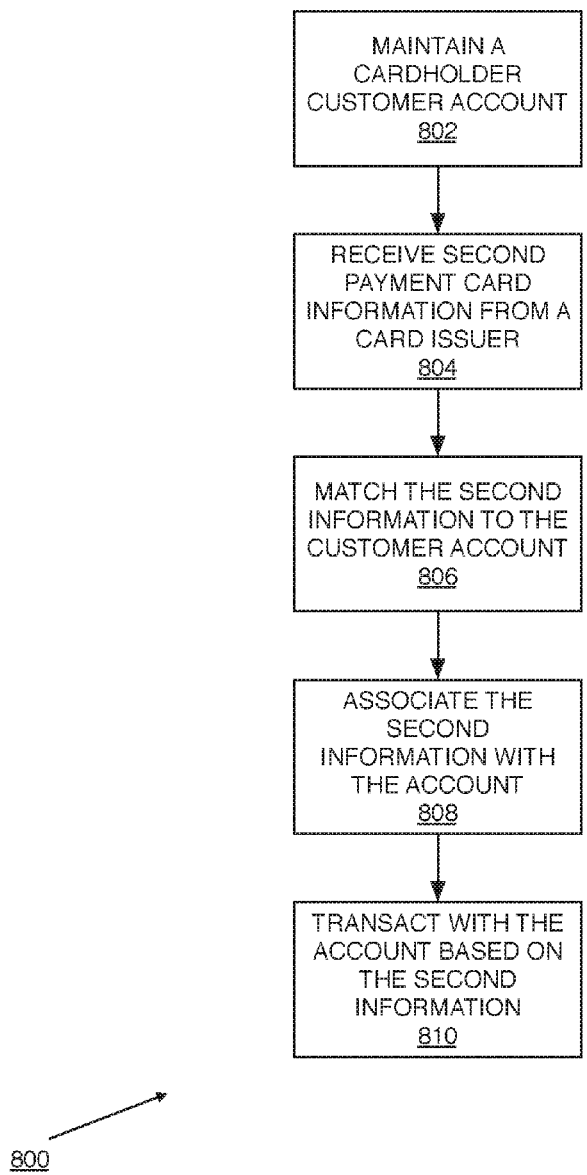
FIG. 8 shows an example embodiment of a process for handling payment information according to the present disclosure.

FIG. 8 shows an example embodiment of a process for handling payment information according to the present disclosure. Some elements of this figure are described above. Thus, same and/or similar reference characters identify identical and/or like components described above and any repetitive detailed description thereof will hereinafter be omitted or simplified in order to avoid complication.

A process 800 includes a plurality of blocks 802-810. Process 800 can be performed in sequential numerical order and/or non-sequential numerical order. Process 800 is performed via merchant 108. However, whether domestically and/or internationally, process 800 can be performed, facilitated for performance, and/or assisted in such performance via at least one entity, such as cardholder 104, card issuer 106, the acquirer of merchant 108, an operator of the credit card transaction network, an independent sales organization reselling to merchant 108 services of the acquirer, an operator of a transaction network which implements electronic payment card transactions, an affinity partner, such as a retailer, a sports team, a university, a charity, a professional organization, lending its name to card issuer 106 for attracting a customer who has a strong relationship with the partner where the partner get paid a fee/balance percentage for each card issued using the partner name, and/or an insurance provider which underwriting various insurance protections offered as payment card perks, such as car rental insurance, hotel burglary insurance, and others.

In block 802, merchant 108 maintains a customer account of cardholder 104. Merchant 108 stores the first information in the account. For example, such maintenance can include securing access to the account, storing transaction data for the account, and others.

In block 804, merchant 108 receives the second information from card issuer 106, as described herein.

In block 806, merchant 108 matches the second information to the customer account. The matching occurs via the payment system based at least in part on receiving the second information from module 410. The matching can be one-to-one correspondence, one-to-many correspondence, many-to-many correspondence, and/or many-to-one correspondence. The matching can be based on precise matching and/or imprecise matching, such as accounting for capital alphanumeric characters. The matching can be statistical, heuristic and/or deterministic based. For example, when, in addition to actual payment data, the second information includes at least one of the customer account data, cardholder 104 personal identification data, cardholder 104 contact information data, and other data relevant to matching to the customer account, then merchant 108 uses such data to match to the customer account.

In block 808, merchant 108, based at least in part on successful matching, such as via identifying the account of cardholder 104 at merchant 108 based at least on part data received from card issuer 106, associates the second information with the account for subsequent charging according thereto. For example, such association can include maintaining, as described herein. Also for example, such association can include storing the second information in the account and replacing the first information in the account with the second information. Merchant 108 can delete the first information from the account and/or choose to keep in the account for documentation/trail/security purposes. Note that the first information can be visible to cardholder 104 and/or invisible to cardholder 104, whether selectively via merchant 108 and/or cardholder 104.

In block 810, merchant 108 transacts with cardholder 104 based at least in part on the second information, as described herein. The second information is stored in the account.

Figure 9:
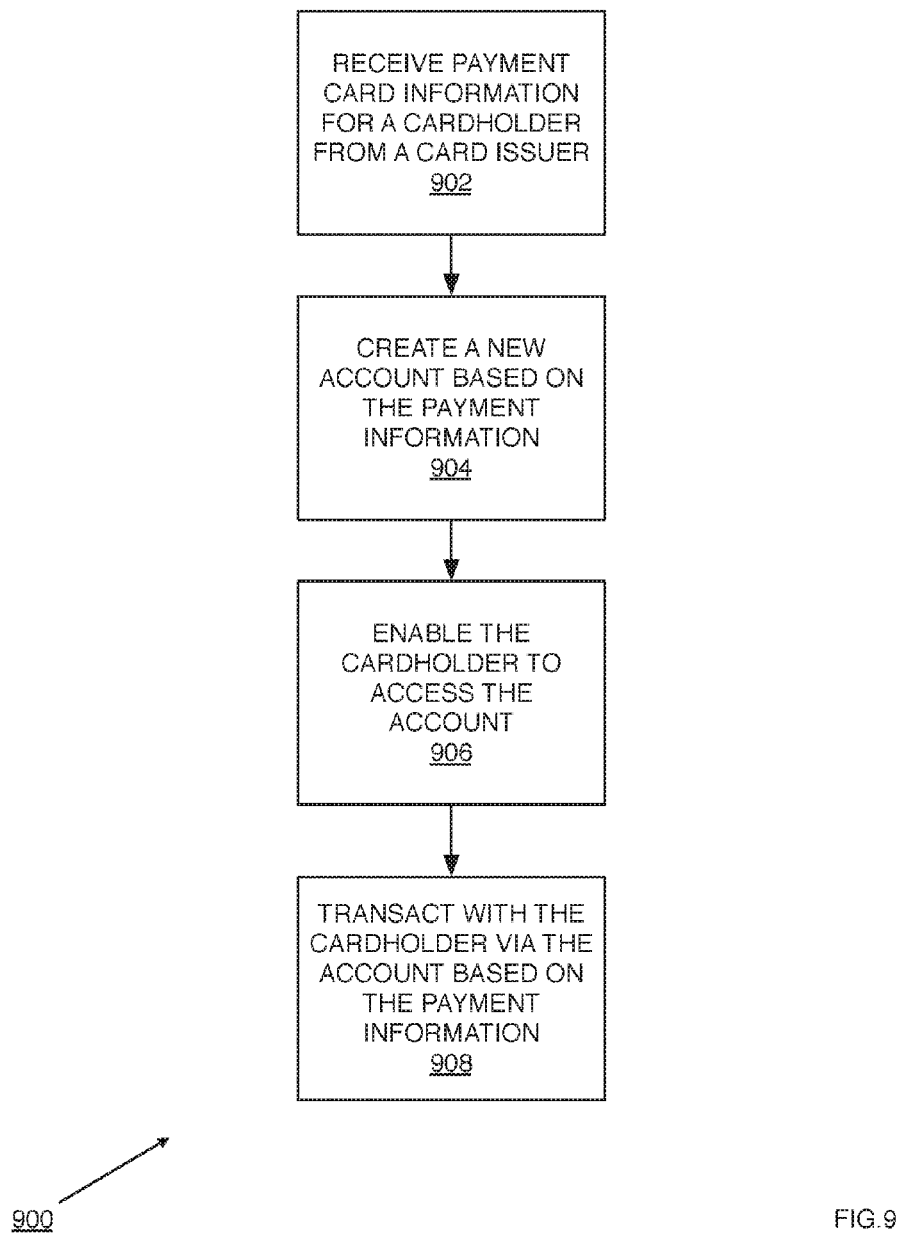
FIG. 9 shows an example embodiment of a process for transacting via a new account according to the present disclosure.

FIG. 9 shows an example embodiment of a process for transacting via a new account according to the present disclosure. Some elements of this figure are described above. Thus, same and/or similar reference characters identify identical and/or like components described above and any repetitive detailed description thereof will hereinafter be omitted or simplified in order to avoid complication.

A process 900 includes a plurality of blocks 902-908. Process 900 can be performed in sequential numerical order and/or non-sequential numerical order. Process 900 is performed via merchant 108. However, whether domestically and/or internationally, process 900 can be performed, facilitated for performance, and/or assisted in such performance via at least one entity, such as cardholder 104, card issuer 106, the acquirer of merchant 108, an operator of the credit card transaction network, an independent sales organization reselling to merchant 108 services of the acquirer, an operator of a transaction network which implements electronic payment card transactions, an affinity partner, such as a retailer, a sports team, a university, a charity, a professional organization, lending its name to card issuer 106 for attracting a customer who has a strong relationship with the partner where the partner get paid a fee/balance percentage for each card issued using the partner name, and/or an insurance provider which underwriting various insurance protections offered as payment card perks, such as car rental insurance, hotel burglary insurance, and others.

In block 902, merchant 108 receives payment card information for cardholder 104 from card issuer 106, such as over network 102. Such receipt is as described herein. For example, such receipt can be via module 410 and/or the logic. Such information can include actual payment data, such as payment card number, expiration date, security code, and others. Note that such data can vary based at least in part on payment card type. Such payment data can include cardholder 104 personal identification data, cardholder 104 contact information data, shipping data, and other cardholder 104 identifying data, such as biometrics.

In block 904, merchant 108 creates a new customer account based on the received payment card information 408. Merchant 108 can communicate with card issuer 106, such as via the acquirer, via network 102, and/or others, to verify validity of the payment information data, check creditworthiness of cardholder 104, and confirm payment data sufficiency to charge cardholder 104 accordingly. Note that merchant 108 can also access other entities for such verification, such as a credit score bureau.

When cardholder 104 already has a duplicate/preexisting account with merchant 108, then merchant 108 can mandate for account joining and updating payment information for latest payment information, as received in block 902 and as described herein, and/or keep the duplicate/preexisting account separate. Merchant 108 can also request cardholder 104 via the preexisting account, such as via email, phone, text, and/or others, how cardholder 104 wants merchant 108 to proceed when a new account would be created. When the duplicate/preexisting accounts are kept separately, then merchant 108 can synchronize both of them based at least in part on latest payment data such that both accounts can be transacted therethrough equally. Also, such synchronization can allow for contact information synchronization, such as address synchronization, and/or signing-in information synchronization, such as email and password synchronization, which can be used if cardholder 104 forgot and/or misplaced such information. Alternatively, when the duplicate/preexisting accounts are kept separately, then merchant 108 can allow for non-synchronization and keeping both accounts totally separately where the first account remains as is. Note that merchant 108 can request for advice from cardholder 104 on a course of action when faced with the duplicate/preexisting account.

In block 906, merchant 108 enables cardholder 104 to access the account. Such enabling is based at least in part on successful verification that the received payment information data is valid, cardholder 104 is creditworthy, and cardholder 104 can be charged according to the received payment information, such as payment sufficiency. Such enabling includes configuring merchant 108 computer system for transacting, notifying cardholder 104 of successful account creation, providing login data for cardholder 104, and others. Resultantly, cardholder 104 can access merchant 108 via the account to transact according to the payment card information. Cardholder 104 can access the account without having to later input payment card information prior to, for example, purchasing an item and/or paying for a service at merchant 108.

In block 908, merchant 108 transacts with cardholder 104 based at least in part on the received payment information, as described herein. The received payment information is stored in the account.

In other embodiments, for greater security/fraud reduction, card issuer 106 can review/rate merchants 108, such as on a pass/fail scale, a tiered scale, and/or others. Such review/rating is based at least in part on internal data and/or external data. Such review/rating is based at least in part on security criteria, fraud criteria, and/or customer service reputation criteria. Then, card issuer 106 can allow cardholder 104 to select for sending of the second information only to those merchants 108 who card issuer 106 approves based at least in part on such review/rating.

In other embodiments, the sending of the second information can be done from one card issuer 106 to another card issuer 106 when cardholder 104 desires that the latter card issuer 106 should be aware of payment information of the former card issuer 106, whether or not, cardholder 104 transacted with the latter card issuer 106 via the former card issuer 106.

Aspects of the present disclosure may be embodied as a system, a method, and/or a computer program product. Accordingly, some implementations of the present disclosure may be embodied in an entirely hardware embodiment, an entirely software embodiment (including firmware, resident software, micro-code, and so forth) and/or an embodiment combining software and hardware aspects that may all generally be referred to herein as a "circuit," "module" or "system." Furthermore, some implementations of the present disclosure may take the form of a computer program product embodied in at least one computer readable medium having computer readable program code embodied thereon. Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present disclosure, a computer readable storage medium may be any tangible medium that can contain, or store a program for use by or in connection with an instruction execution system, apparatus, and/or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate or transport a program for use by and/or in connection with an instruction execution system, an apparatus and/or a device.

Program code embodied on a computer readable medium may be transmitted using any appropriate medium, including but not limited to wireless, wired, optical fiber cable, radio frequency, and so forth, or any suitable combination of the foregoing. Computer program code for carrying out operations for aspects of the present disclosure may be written in any combination of one or more programming languages, including an object oriented programming language, such as Java, Smalltalk, C#, C++ or the like, and procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. Each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). Note that, in some alternative implementations, the functions noted in the block may occur out of the order noted in the figures. For example, two blocks shown in succession may be executed substantially concurrently, or the blocks may sometimes be executed in the reverse order, depending upon the functionality involved. Each block of the block diagrams and/or flowchart illustration, and combinations of blocks in the block diagrams and/or flowchart illustration can be implemented by special purpose hardware-based systems that perform the specified functions or acts, or combinations of special purpose hardware and computer instructions. The flow diagrams depicted herein are just one example. There may be many variations to this diagram or the steps (or operations) described therein without departing from the spirit of the disclosure. For instance, the steps may be performed in a differing order or steps may be added, deleted, and/or modified. All of these variations are considered a part of the claimed disclosure.

The corresponding structures, materials, acts, and equivalents of all means or step plus function elements in the claims below are intended to include any structure, material, or act for performing the function in combination with other claimed elements as specifically claimed.

The description of the present disclosure has been presented for purposes of illustration and description, but is not intended to be fully exhaustive and/or limited to the disclosure in the form disclosed. Many modifications and variations in techniques and structures are apparent to those of ordinary skill in the art without departing from the scope and spirit of the disclosure as set forth in the claims that follow. Accordingly, such modifications and variations are contemplated as being a part of the present disclosure. The scope of the present disclosure is defined by the claims, which includes known equivalents and unforeseeable equivalents at the time of filing of the present disclosure.

What is claimed is:

1. A method of selectively updating cardholder payment information for card not present transactions, the method comprising:
   sending, by a credit card issuer server, a set of processor-executable instructions to a merchant server hosting a first operating system and a first application, wherein the first application runs on the first operating system, wherein the set of processor-executable instructions configures the first application to receive a first credit card number after the merchant server executes the set of processor-executable instructions, wherein the credit card issuer server is remote from the merchant server;
   processing, by the credit card issuer server, a plurality of card not present transaction messages comprising a plurality of merchant identifiers, wherein the merchant identifiers are distinct from each other, wherein the card not present transaction messages involve a second credit card number stored in a cardholder account record stored in a database accessible to the credit card issuer server;
   deactivating, by the credit card issuer server, the second credit card number in the cardholder account record such that the second credit card number is transactionally unusable;
   activating, by the credit card issuer server, based at least in part on the deactivating, a third credit card number stored in the cardholder account record such that the third credit card number is transactionally usable, wherein the third credit card number has same format as the first credit card number;
   after the merchant server executes the set of processor-executable instructions:
      accessing, by the credit card issuer server, a plurality of transaction records in the database, wherein the transaction records reference the merchant identifiers;
      identifying, by the credit card issuer server, based at least in part on the accessing, a merchant identifier from the merchant identifiers based at least in part on a frequency of the card not present transaction messages associated with the merchant identifier, wherein the merchant identifier is associated with the merchant server;
      serving, by the credit card issuer server, based at least in part on the identifying, a display of the merchant identifier in a graphical user interface of a second application running on a second operating system of a cardholder client associated with the cardholder account record, wherein the credit card issuer server is remote from the cardholder client, wherein the cardholder client includes a user input device, wherein the first application is distinct from the second application, wherein the first operating system is distinct from the second operating system;
      receiving, by the credit card issuer server, an input from the cardholder client based at least in part on the display, wherein the input is indicative of the merchant identifier, wherein the input is via the user input device while the merchant identifier is displayed in the graphical user interface;
      accessing, by the credit issuer server, based at least in part on the receiving, the third credit card number in the cardholder account record;
      sending, by the credit card issuer server, the third credit card number to the merchant server based at least in part on the accessing the third credit card number;
      processing, by the credit card issuer server, a card not present transaction message involving the third credit card number based at least in part on the sending the third credit card number such that the transaction records can be updated to reference the card not present transaction message, wherein the card not present transaction message is associated with the merchant identifier.

2. The method of claim 1, further comprising:
receiving, by the credit card issuer server, a message from the merchant server, wherein the message informs of a receipt of the third credit card number by the merchant server based at least in part on the sending.

3. The method of claim 1, further comprising:
receiving, by the credit card issuer server, a message from the merchant server, wherein the message informs of a storage of the third credit card number on a data store coupled to the merchant server.

4. The method of claim 1, wherein the input is indicative of the merchant identifier via at least one of an alphanumeric text, a voice, an image, a symbol, or a selection from a plurality of choices.

5. The method of claim 1, wherein the input is indicative of the merchant identifier via at least one of a text box, a combo box, a radio button, a check box, a split button, a slider, a list box, a spinner, a drop-down list, a control menu, a pie menu, or a ribbon presented in the graphical user interface.

6. The method of claim 1, wherein the sending of the third credit card number is without the merchant server being informed by the credit card issuer server of the sending the third credit card number prior to the sending of the third credit card number.

7. The method of claim 1, wherein the third credit card number is sent via at least one of alphanumeric, symbolic, audio, or video data.

8. The method of claim 1, wherein the third credit card number is sent in an amended manner.

9. The method of claim 1, wherein the sending of the third credit card number is via at least one of a browser-based email, a client-based email, an instant message, a text message, a short message service, a chat, a voice chat, a web conference, a physical snail mail, a telephone, a facsimile, a webpage, a social media post, a social media message, a module-to-module message, a hypertext transfer protocol, or a file transfer protocol.

10. The method of claim 1, wherein the sending of the third credit card number is without a message requesting the merchant server to update cardholder payment information.

11. The method of claim 1, further comprising:
providing, by the credit card issuer server, a hyperlink to the merchant server before the sending of the third credit card number, wherein the hyperlink is programmed to lead to a network page containing the third credit card number, wherein the sending of the third credit card number is based at least in part on activating the hyperlink based at least in part on the providing.

12. The method of claim 1, further comprising:
receiving, by the credit card issuer server, a preference list from the merchant server, wherein the preference list lists a preferred manner of sending the third credit card number, wherein the sending of the third credit card number is based at least in part on the preference list.

13. The method of claim 1, further comprising:
sending, by the credit card issuer server, a message to the cardholder client, wherein the message informs of the sending of the third credit card number.

14. The method of claim 1, wherein the sending of the third credit card number comprises sending non-payment information from the cardholder account record to the merchant server.

15. The method of claim 1, wherein the set of processor-executable instructions facilitates a storage of the third credit card number on a data store coupled to the merchant server.

16. A method of selectively updating cardholder payment information for card not present transactions, the method comprising:
sending, by a debit card issuer server, a set of processor-executable instructions to a merchant server hosting a first operating system and a first application, wherein the first application runs on the first operating system, wherein the set of processor-executable instructions configures the first application to receive a first debit card number after the merchant server executes the set of processor-executable instructions, wherein the debit card issuer server is remote from the merchant server;
processing, by the debit card issuer server, a plurality of card not present transaction messages comprising a plurality of merchant identifiers, wherein the merchant identifiers are distinct from each other, wherein the card not present transaction messages involve a second debit card number stored in a cardholder account record stored in a database accessible to the debit card issuer server;
deactivating, by the debit card issuer server, the second debit card number in the cardholder account record such that the second debit card number is transactionally unusable;
activating, by the debit card issuer server, based at least in part on the deactivating, a third debit card number stored in the cardholder account record such that the third debit card number is transactionally usable, wherein the third debit card number has same format as the first debit card number;
after the merchant server executes the set of processor-executable instructions:
accessing, by the debit card issuer server, a plurality of transaction records in the database, wherein the transaction records reference the merchant identifiers;
identifying, by the debit card issuer server, based at least in part on the accessing, a merchant identifier from the merchant identifiers based at least in part on a frequency of the card not present transaction messages associated with the merchant identifier, wherein the merchant identifier is associated with the merchant server;
serving, by the debit card issuer server, based at least in part on the identifying, a display of the merchant identifier in a graphical user interface of a second application running on a second operating system of a cardholder client associated with the cardholder account record, wherein the debit card issuer server is remote from the cardholder client, wherein the cardholder client includes a user input device, wherein the first application is distinct from the second application, wherein the first operating system is distinct from the second operating system;
receiving, by the debit card issuer server, an input from the cardholder client based at least in part on the display, wherein the input is indicative of the merchant identifier, wherein the input is via the user input device while the merchant identifier is displayed in the graphical user interface;
accessing, by the debit card issuer server, based at least in part on the receiving, the third debit card number in the cardholder account record;
sending, by the debit card issuer server, the third debit card number to the merchant server based at least in part on the accessing the third debit card number;

processing, by the debit card issuer server, a card not present transaction message involving the third debit card number based at least in part on the sending the third debit card number such that the transaction records can be updated to reference the card not present transaction message, wherein the card not present transaction message is associated with the merchant identifier.

17. A method of selectively updating cardholder payment information for card not present transactions, the method comprising:
sending, by a payment card issuer server, a set of processor-executable instructions to a merchant server hosting a first operating system and a first application, wherein the first application runs on the first operating system, wherein the set of processor-executable instructions configures the first application to receive a first payment card number after the merchant server executes the set of processor-executable instructions, wherein the payment card issuer server is remote from the merchant server;
processing, by the payment card issuer server, a plurality of card not present transaction messages comprising a plurality of merchant identifiers, wherein the merchant identifiers are distinct from each other, wherein the card not present transaction messages involve a second payment card number stored in a cardholder account record stored in a database accessible to the payment card issuer server;
deactivating, by the payment card issuer server, the second payment card number in the cardholder account record such that the second payment card number is transactionally unusable;
activating, by the payment card issuer server, based at least in part on the deactivating, a third payment card number stored in the cardholder account record such that the payment card number is transactionally usable, wherein the third payment card number has same format as the first payment card number;
after the merchant server executes the set of processor-executable instructions:
  accessing, by the payment card issuer server, a plurality of transaction records in the database, wherein the transaction records reference the merchant identifiers;
  identifying, by the payment card issuer server, based at least in part on the accessing, a merchant identifier from the merchant identifiers based at least in part on at least one of a frequency of the card not present transaction messages, an amount per card not present transaction message from the card not present transaction messages, or a card not present total amount spent per merchant identifier from the card not present transaction messages, wherein the merchant identifier is associated with the merchant server;
  serving, by the payment card issuer server, based at least in part on the identifying, a graphical output of the merchant identifier in a second application running on a second operating system of a client associated with the cardholder account record, wherein the client includes a user input device, wherein the first application is distinct from the second application, wherein the first operating system is distinct from the second operating system;
  receiving, by the payment card issuer server, an input from the client based at least in part on the graphical output, wherein the input is indicative of the merchant identifier, wherein the input is via the user input device while the merchant identifier is graphically output in the second application;
  accessing, by the payment card issuer server, based at least in part on the receiving, the third payment card number in the cardholder account record;
  sending, by the payment card issuer server, the third payment card number to the merchant server based at least in part on the accessing;
  processing, by the payment card issuer server, a card not present transaction message involving the third payment card number based at least in part on the sending the third payment card number such that the transaction records can be updated to reference the card not present transaction message, wherein the card not present transaction message is associated with the merchant server.

18. The method of claim 16, wherein at least one of:
the input is indicative of the merchant identifier based at least in part on the input being received via at least one of a text box, a combo box, a radio button, a check box, a split button, a slider, a list box, a spinner, a drop-down list, a control menu, a pie menu, or a ribbon shown in the graphical user interface,
the sending of the third debit card number is without the merchant server being informed by the debit card issuer server of the sending the third debit card number prior to the sending of the third debit card number, or
the sending of the third debit card number is without a message requesting the merchant server to update cardholder payment information.

19. The method of claim 16, further comprising at least one of:
receiving, by the debit card issuer server, a message from the merchant server, wherein the message informs of a receipt of the third debit card number by the merchant server based at least in part on the sending,
receiving, by the debit card issuer server, a message from the merchant server, wherein the message informs of a storage of the third debit card number on a data store coupled to the merchant server, or
sending, by the debit card issuer server, a message to the client, wherein the message informs of the sending of the third debit card number.

20. The method of claim 16, wherein the set of processor-executable instructions facilitates a storage of the third debit card number on a data store coupled to the merchant server.

* * * * *